United States Patent

Norita et al.

[11] Patent Number: 6,151,118
[45] Date of Patent: *Nov. 21, 2000

[54] THREE-DIMENSIONAL MEASURING SYSTEM AND METHOD OF MEASURING THE SHAPE OF AN OBJECT

[75] Inventors: Toshio Norita, Osaka; Hiroshi Uchino, Kyoto; Hideki Tanabe, Ibaraki, all of Japan

[73] Assignee: Minolta Co., Ltd, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/972,432

[22] Filed: Nov. 18, 1997

[30] Foreign Application Priority Data

Nov. 19, 1996 [JP] Japan .................................. 8-308106
Oct. 9, 1997 [JP] Japan .................................. 9-276848

[51] Int. Cl.⁷ .................................................. G01B 11/24
[52] U.S. Cl. .............................................................. 356/376
[58] Field of Search ..................................... 356/237, 376, 356/375, 387, 386, 384, 385, 398, 237.1–237.6; 364/488, 490, 578; 382/149, 141, 153

[56] References Cited

U.S. PATENT DOCUMENTS

| | | |
|---|---|---|
| 4,758,093 | 7/1988 | Stern et al. . |
| 4,794,262 | 12/1988 | Sato et al. . |
| 4,882,490 | 11/1989 | Takasaki et al. . |
| 4,939,379 | 7/1990 | Horn . |
| 5,024,529 | 6/1991 | Svetkoff et al. . |
| 5,102,223 | 4/1992 | Uesugi et al. . |
| 5,151,599 | 9/1992 | Monnet et al. . |
| 5,175,595 | 12/1992 | Fukase . |
| 5,362,958 | 11/1994 | Ando . |
| 5,661,671 | 8/1997 | Ooenoki et al. . |
| 5,668,631 | 9/1997 | Norita et al. . |

FOREIGN PATENT DOCUMENTS

| | | |
|---|---|---|
| 4-83133 | 3/1992 | Japan . |
| 5-196432 | 8/1993 | Japan . |

*Primary Examiner*—Hoa Q Pham

[57] ABSTRACT

A three-dimensional measuring system comprises an optical system for emitting a light and optically scanning an object, a measuring sensor having an image pickup surface consisting of a plurality of picture elements and adapted to receive the light reflected on the surface of the object, a galvanometer mirror for changing a direction in which the light irradiates the object, a system controller for driving the measuring sensor so as to allow the same to output information on the quantity of light incident on each of the picture elements, and a barycentric calculation circuit for finding an instant when the light traverses each of the picture elements. This instant is found by implementing a barycentric calculation on the basis of outputs of the measuring sensor taken for a prescribed period of time and an instant at which each of the outputs is taken. The measuring system further comprises a host computer for finding a position on the surface of the object corresponding to each of the picture elements. This position is found on the basis of a relationship between a direction in which the light irradiates the object at an instant when the light traverses each of the picture elements and a direction in which the light reflected on the surface of the object is incident on each of the picture elements.

15 Claims, 26 Drawing Sheets

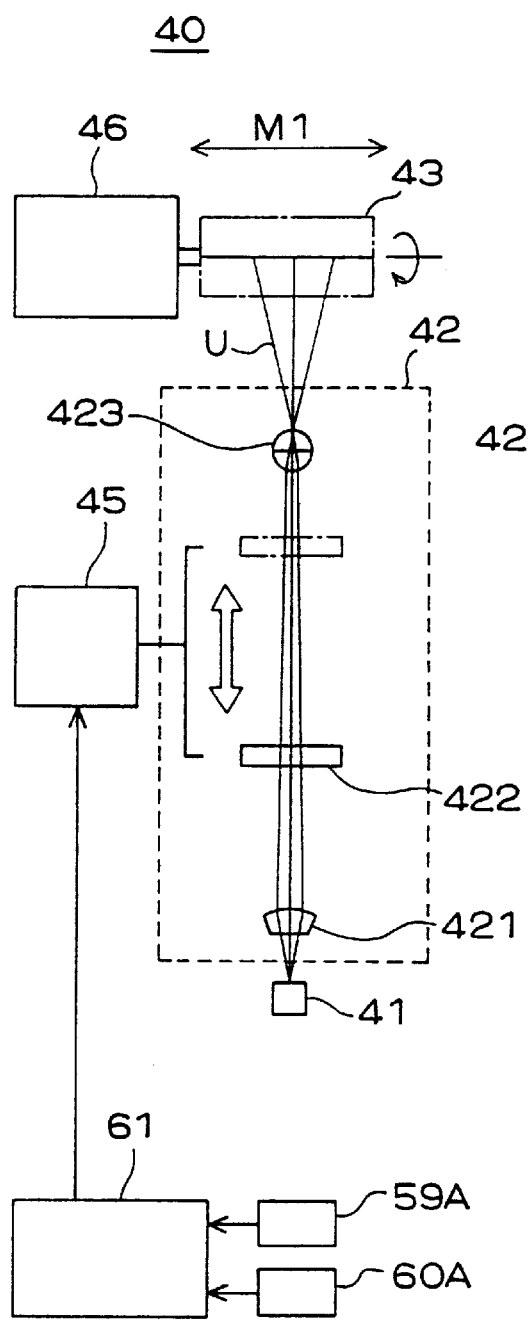
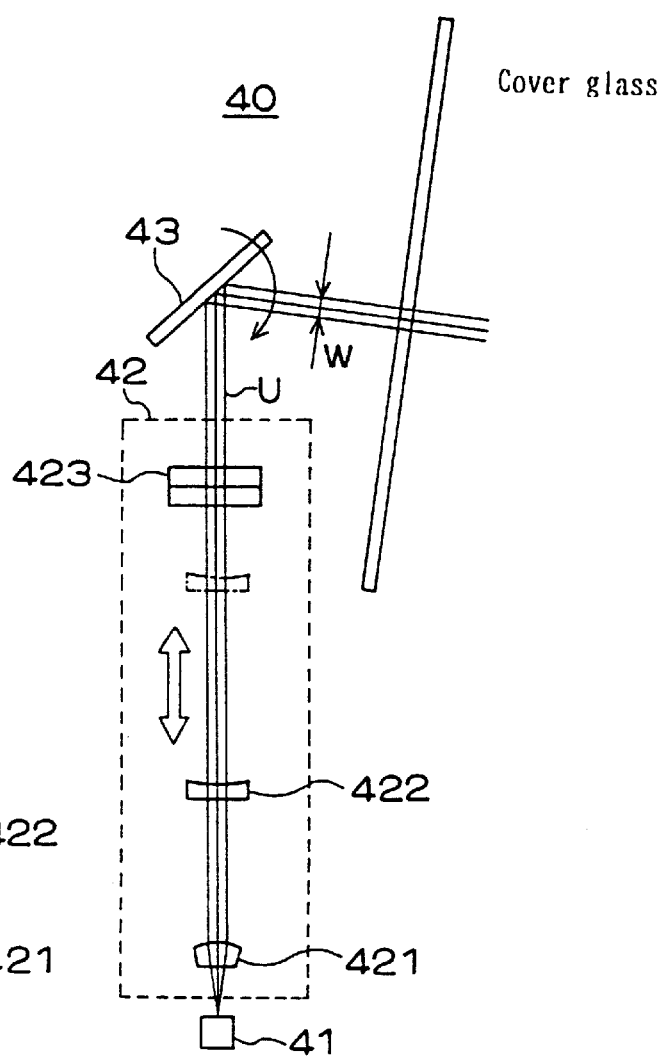
FIG. 4(a)
FIG. 4(b)

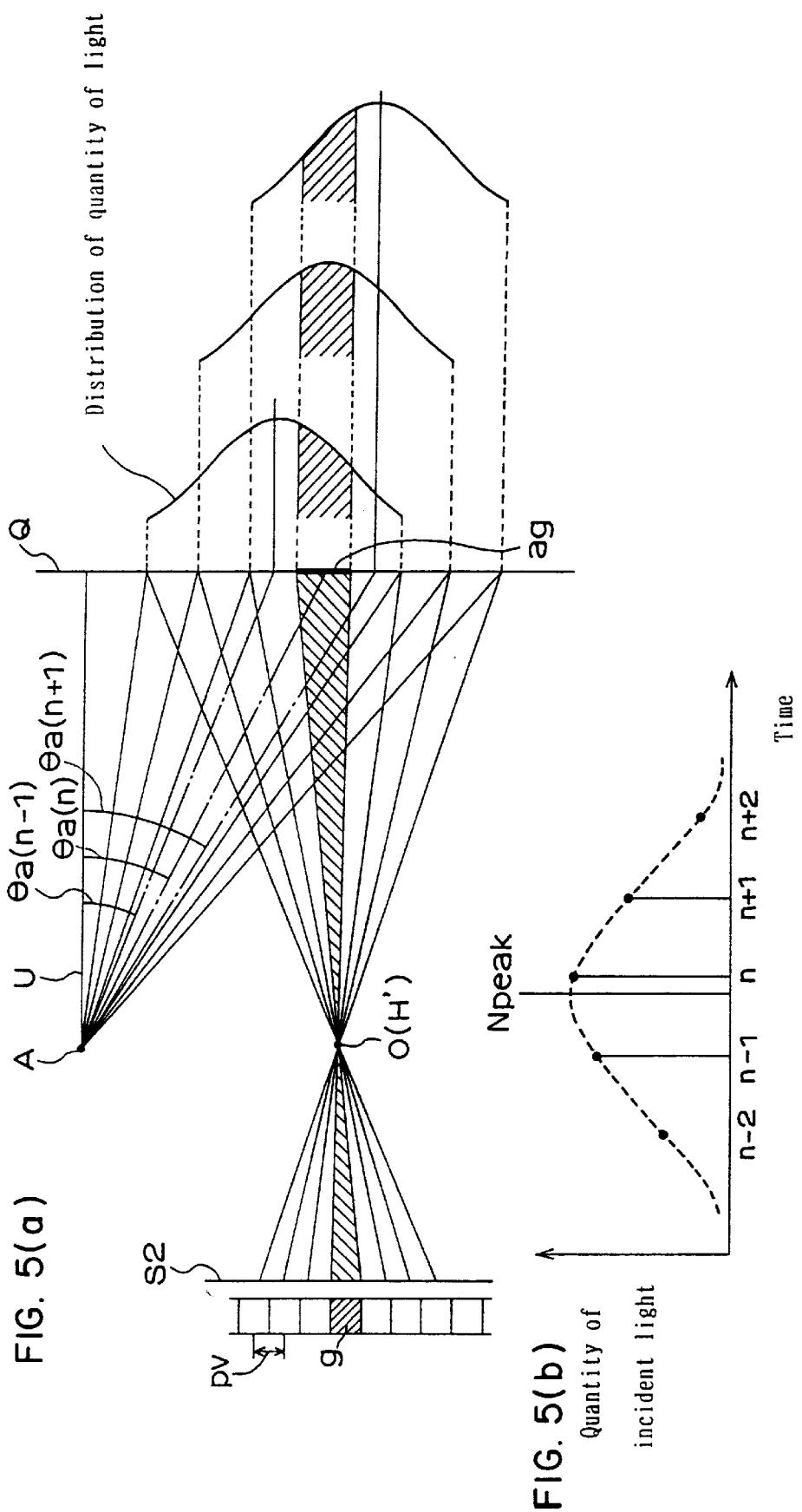

Fig. 22

| Frame number | Image pick-up surface | Address Py ||||||||
|---|---|---|---|---|---|---|---|---|
| | | 0 | 1 | 2 | ...... | 29 | 30 | 31 |
| 1 | 1～32 | 32 | | | | | | |
| 2 | 2～33 | 32 | 33 | | | | | |
| 3 | 3～34 | 32 | 33 | 34 | | | | |
| ⋮ | ⋮ | ⋮ | ⋮ | ⋮ | | | | |
| 31 | 31～62 | 32 | 33 | 34 | ...... | 61 | 62 | |
| 32 | 32～63 | 32 | 33 | 34 | ...... | 61 | 62 | 63 |
| 33 | 33～64 | 64 | 33 | 34 | ...... | 61 | 62 | 63 |
| 34 | 34～65 | 64 | 65 | 34 | ...... | 61 | 62 | 63 |

Line number

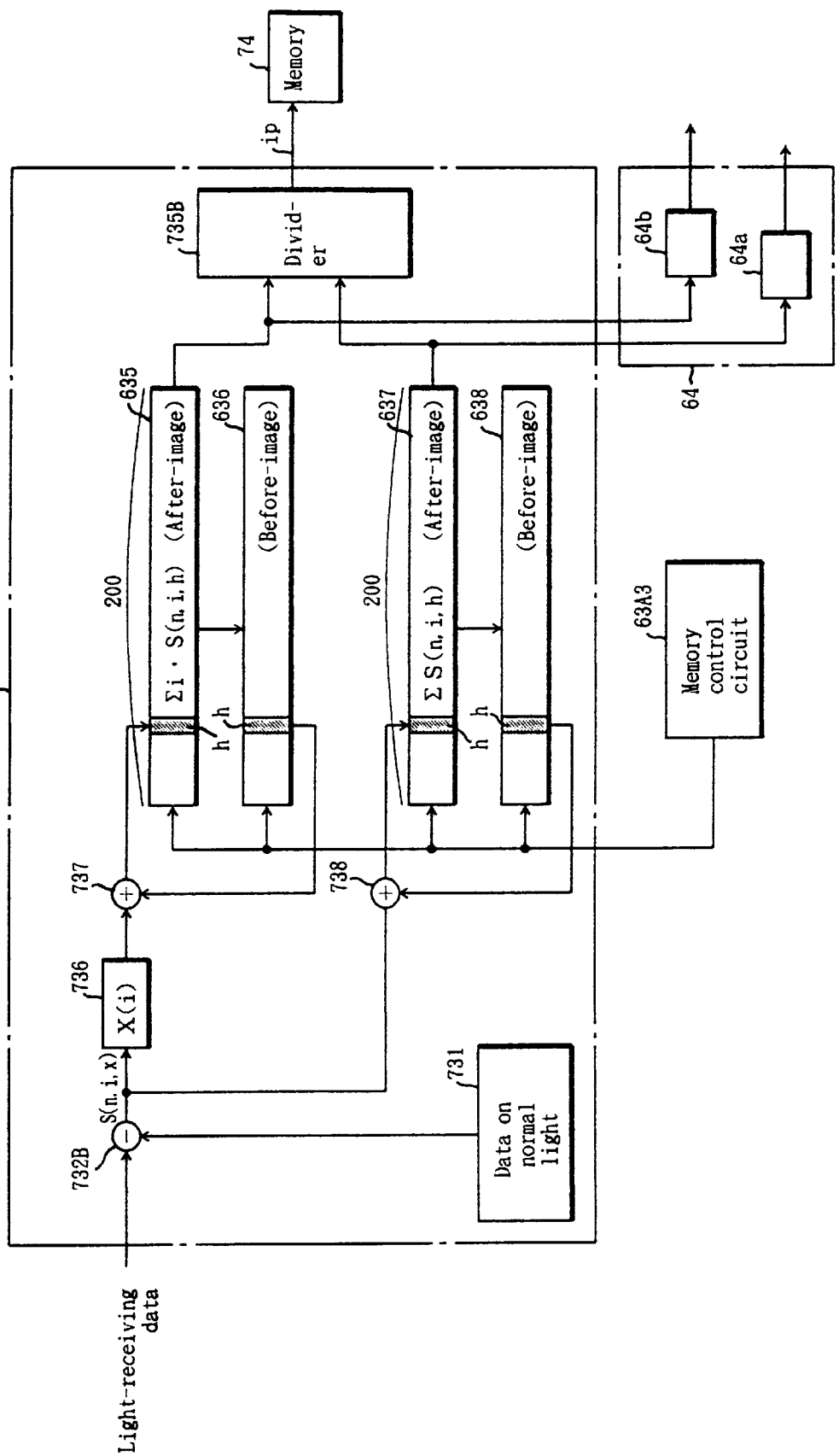

Image pickup surface S 2

Image pickup surface S 2

THREE-DIMENSIONAL MEASURING SYSTEM AND METHOD OF MEASURING THE SHAPE OF AN OBJECT

FIELD OF THE INVENTION

This invention relates to a three-dimensional measuring system for measuring the shape of an object on a noncontact basis, the object being irradiated either by a spotlight or by light beams filtering through a slit aperture. The invention also relates to a method of measuring the shape of an object.

BACKGROUND OF THE INVENTION

A noncontact three-dimensional measuring system, which is also called a range finder, is capable of high-speed measurement as compared with a contact measuring system and is found particularly advantageous when used to measure a body contour, to allow a robot to visually recognize an object, or to input data to a CG (Computer Graphics) system or a CAD (Computer Aided Design) system.

As a method of obtaining a three-dimensional image of an object by optically scanning it, it is known to use light beams filtering through a slit aperture in a range finder and consequently being of rectilinear cross-section. This method is called a light section method, which is characterized in that the object is actively irradiated by light beams. The three-dimensional image obtained by this method is an aggregate of the three-dimensional positions of points disposed on the surface of the object.

FIGS. 25(a–d) provide diagrammatic illustrations of the aforesaid method. FIGS. 26(a–c) are diagrams for the principle of measurement to be carried out by the aforesaid method.

FIGS. 25(a–d) are based on the assumption that the shape of an object Q is going to be measured. For this purpose, the object Q is irradiated by a thin strip of light beams U. Reflected light beams are directed to the image pickup surface S2 of a two-dimensional image sensor (FIG. 25(a)). A rectilinear image is obtained when a flat portion of the object Q is irradiated (FIG. 25(b)). A curved or step-formed image is obtained when an uneven portion of the object Q is irradiated (FIG. 25(c)). Thus a position on the image pickup surface S2 on which a reflected light beam is incident is determined by the distance between the measuring apparatus and a point on the surface of the object Q at which the light beam is reflected (FIG. 25(d)). In order to take samples of three-dimensional positions from the surface of the object, the thin strip of light beams U is pivoted in a direction which is perpendicular to a virtual plane formed by the thin strip of light beams U. The sample size depends on the number of picture elements provided on the surface of the image sensor.

As shown in FIGS. 26(a–c), the relative positions of a light-emitting assembly including a luminescent spot A and a light-receiving assembly including a principal point O are such that a base line AO connecting the luminescent spot A with the principal point O is perpendicular to a light-receiving axis which in turn is perpendicular to the image pickup surface S2. The principal point O of the lens assembly lies on the light-receiving axis and is disposed away from the image pickup surface S2 by an image distance b, which is the sum of a focal length f and an amount of shift of a lens effected for adjusting the focus thereof.

In FIGS. 26(a–c), the spatial directions are designated by the letters X, Y and Z, where the Z axis is constituted by the light-receiving axis, the Y axis is constituted by the base line AO, and the X axis extends in the direction between the two edges of, i.e. transverse to, the thin strip of light beams U, with an origin constituted by the principal point O. A light beam U irradiating a point P (X, Y, Z) disposed on the surface of the object makes an angle θa with a reference plane passing along the luminescent spot A and extending parallel with the XZ plane. This angle is hereinafter referred to as a "light-emitting angle". On the other hand, by the expression "light-receiving angle" as used herein is meant an angle θp made by the XZ plane with a line connecting the point P with the principal point O. Then the distance L between the luminescent spot A and the principal point O is given by $$L = L1 + L2 = Z \tan \theta a + Z \tan \theta p$$

where L1=distance between the point P and the reference plane

L2=distance between the point P and the XZ plane

Z=Z coordinate of the point P

Whence, we obtain $$Z = L/(\tan \theta a + \tan \theta p) \tag{1}$$

The X and Y coordinates of the point P are given by $$X = xp/\beta \tag{2}$$

$$Y = yp/\beta \tag{3}$$

where xp=distance between the image of point P and the center of image pickup surface S2 measured along the X axis yp+distance therebetween measured along the Y axis β=magnification b/Z The light-emitting angle θa is determined by an angular velocity at which the thin strip of light beams U is pivoted. The light-receiving angle θp can be calculated from tan θp=yp/b. Therefore, the three-dimensional position of the point P can be found from the measurement of xp, yp and θa.

When a zoom lens assembly having front- and rear-side principal points H and H' is incorporated in the light-receiving assembly as shown in FIG. 26(c), the rear-side principal point H' serves as the aforesaid principal point O. In this case, the Z coordinate of the point P is given by $$L = L1 + L2 = Z \tan \theta a + (Z-M) \tan \theta p$$

$$\therefore Z = (L + M \tan \theta p)/(\tan \theta a + \tan \theta p)$$

where M=distance between the principal points H and H'

The resolution of a three-dimensional measuring system depends on the density of picture elements arranged on the surface of an image pickup means incorporated in the measuring system. This means that, when an image pickup means such as a CCD (Charge Coupled Device) image sensor having only a limited number of picture elements on the image pickup surface S2 is used, only a limited number of images of points P, which are determined by the xp and yp coordinates on the image pickup surface S2, result therefrom.

A previously proposed measuring apparatus (see U.S. patent application Ser. No. 08/748,325) has been designed to make it possible to obtain high resolution and high accuracy irrespective of the density of picture elements. The thin strip of light beams U used in this apparatus is thick enough to vertically cover approximately five picture elements on the image pickup surface S2. One of these five picture elements on which the largest quantity of light is assumed to be incident, together with two picture elements which are disposed right over and right beneath the aforesaid one respectively, is used for interpolation for finding a position on which the largest quantity of light is actually incident. This position is hereinafter referred to as a "peak position", which determines the aforesaid light-emitting angle θa made by the thin strip of light beams U. By virtue of the interpolation, the moment at which the peak position is found can fall within one of several sections into which the time interval between the sampling times n−1 and n (FIG. 5(b)) is divided.

Noise, which may be contributed to the output signal of the image pickup means, results from the distortion of a lens, wrong focusing, or the characteristic of an optical system. In the absence of noise, the distribution of the quantity of light in a direction which is perpendicular to a virtual plane formed by the thin strip of light beams U is normal as shown in FIG. 5(a). Noise causes serious departure from a normal distribution of the quantity of light, and a skewed, bimodal or flat distribution occurs, which constitutes one of the sources of error in the aforesaid previously proposed apparatus. A skewed distribution is especially apt to occur when the distribution of the quantity of light in the immediate vicinity of the peak position is nearly flat, e.g., when the thin strip of light beams incident on the image pickup element is thickened by the light-receiving optical system zoomed in the direction of the long-range focus, or when the departure from a normal distribution takes the form of a flat peak which results from the construction of the light-emitting optical system.

The aforesaid problem may be solved if the quantities of light obtained over a sufficiently long period of time before and after passage through the assumed peak position are used for interpolation. However, this attempt will necessitate the use of a complicated electrical circuit.

SUMMARY OF THE INVENTION

It is accordingly a principal object of the present invention to provide an image processor of simplified construction which is hardly affected by noise and which makes it possible to obtain high resolution and high accuracy.

A three-dimensional measuring system in accordance with one aspect of the present invention comprises an optical mechanism for emitting a light and optically scanning an object, an image pickup sensor having an image pickup surface consisting of a plurality of light-receiving regions and adapted to receive the light reflected on the surface of the object, a scanning device for changing a direction in which the light irradiates the object, an image pickup control device for driving the image pickup sensor so as to allow the same to output information on the quantity of light incident on each of the light-receiving regions, a first arithmetic unit for finding an instant when the light traverses each of the light-receiving regions, the instant being found by implementing a barycentric calculation on the basis of outputs (x) of the image pickup sensor taken for a prescribed period of time and an instant (i) at which each of the outputs (x) is taken, and a second arithmetic unit for finding a position on the surface of the object corresponding to each of the light-receiving regions, the position being found on the basis of a relationship between a direction in which the light irradiates the object at an instant when the light traverses each of the light-receiving regions and a direction in which the light reflected on the surface of the object is incident on each of the light-receiving regions.

The aforesaid first arithmeetic unit may comprise a first adder for calculating a sum Σ(x·i) of all terms of (x·i), which is a product of each of the outputs (x) taken for the prescribed period of time and an instant (i) when each of the outputs (x) is taken, a second adder for calculating a sum Σ(x) of all of the outputs (x), and a divider for calculating Σ(x·i)/Σ(x) on the basis of outputs taken from the first adder and the second adder, a quotient obtained therefrom being a temporal center $N_{peak}$ of gravity.

The aforesaid prescribed period of time may be a period of time required for allowing the light to traverse an effective domain of the light-receiving regions corresponding to a measurable range within which the object falls.

According to another aspect of the invention, the aforesaid first and second arithmetic units are replaced with a third arithmetic unit for finding a position on the image pickup surface in which information on the largest quantity of light is obtained from a light irradiating the object in a specific direction, the position being found by implementing a barycentric calculation on the basis of outputs (x) of the image pickup sensor and position coordinates (i) of the light-receiving regions which fall within a predetermined vertical coverage of an incident light and from which the outputs (x) are taken, and a fourth arithmetic unit for finding a position on the surface of the object corresponding to each of the light-receiving regions, the position being found on the basis of a relationship between the aforesaid specific direction and a direction in which the light reflected on the surface of the object is incident on the position found by the third arithmetic unit.

BRIEF DESCRIPTION OF THE DRAWINGS

FIGS. 4(a) and 4(b) are diagrammatic views of a light-emiitting lens assembly;

FIGS. 5(a) and 5(b) are diagrammatic views illustrating a principle on which the calculation of three-dimensional positions on the surface of an object is based;

FIG. 22 is a view showing the line numbers for data stored in addresses py in the VRAM;

FIG. 24 is a similar view to that shown in FIG. 21 but including a circuit for calculating the spatial center of gravity;

DETAILED DESCRIPTION

Figure 26A:
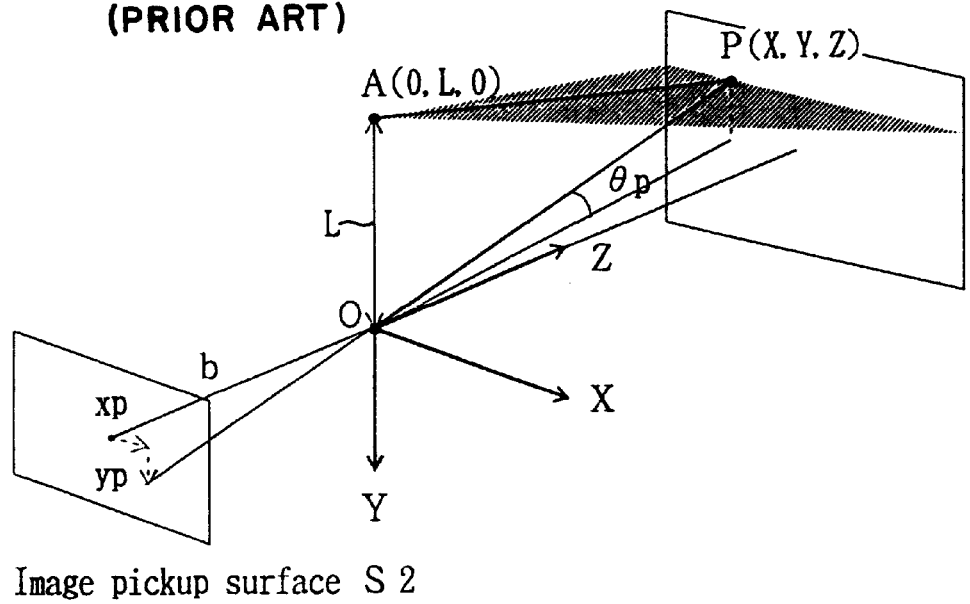
FIGS. 26(*a–c*) are diagrams for the principle of measurement to be carried out by the aforesaid method.
Figure 26B:
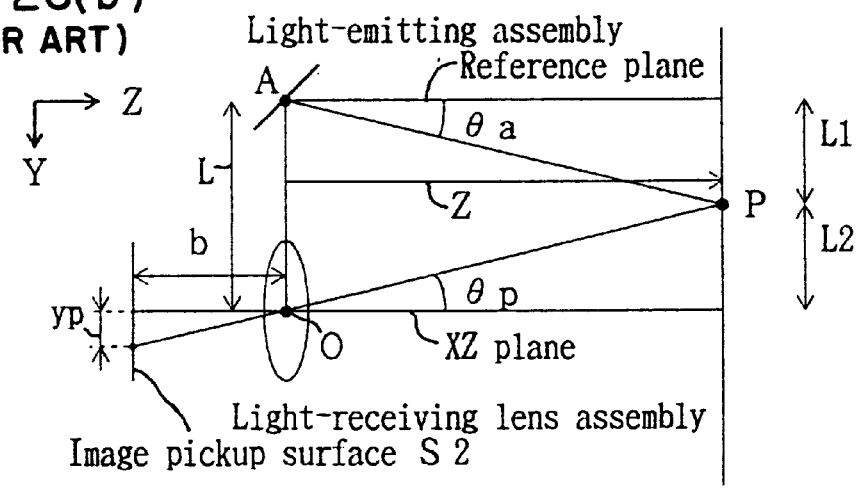
Figure 26C:
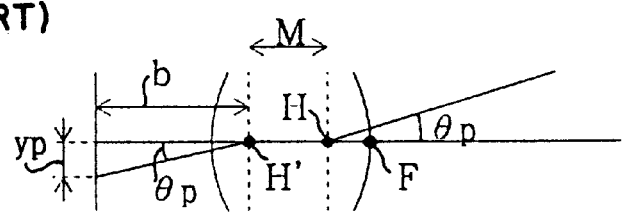

As aforesaid in reference to FIGS. 26(*a–c*), the three-dimensional position of the point P can be found from the relationship between the light-emitting angle θa and the light-receiving angle θp.

The light-emitting angle θa is an angle through which the thin strip of light beams U is pivoted from the aforesaid reference plane. This angle is found from an angular velocity at which the thin strip of light beams U is pivoted and the elapsed time after the departure of the thin strip of light beams U from the reference plane. The angular velocity and the elapsed time can be obtained from a driving pulse or a position signal transmitted by a scanning means, clock pulses generated for the purpose of control, sampling pulses generated for the purpose of measurement, or an internal clock.

The light-receiving angle θp is calculated from the yp coordinate of a point image on the image pickup surface. The accuracy of calculation is determined by the density of picture elements arranged on the surface of an image pickup means incorporated in the measuring system. This means that, when an image pickup means such as a CCD image sensor having only a limited number of picture elements on the image pickup surface is used, only a limited number of images of points P result therefrom.

According to this invention, the calculation of temporal and spatial centers of gravity is proposed for the interpolation as a solution for enabling the calculation of θp to be accurate in so far as possible.

By the expression "temporal center $N_{peak}$ of gravity" as used herein is meant a center of gravity calculated on the basis of a data row obtained from one picture element after another, each picture element being subjected to sampling procedures at a plurality of sampling times. From a single specific one of the picture elements, outputs (x) are taken for a prescribed period of time during which the thin strip of light beams U is pivoted. In other words, the temporal center $N_{peak}$ of gravity concerns itself with an instant (i) at which the output (x) of a picture element is maximized. Thereby the temporal center $N_{peak}$ of gravity makes it possible to specify the light-emitting angle θa. The light-receiving angle θp can be found from the yp coordinate of the aforesaid picture element. The values of θa and θp make it possible to find the Z coordinate of the point P. The X and Y coordinates of the point P can also be found from the temporal center $N_{peak}$ of gravity and the xp and yp coordinates of the aforesaid picture element.

In order to calculate the temporal center $N_{peak}$ of gravity, samples of the outputs (x) of each picture element are taken periodically for a prescribed length of time. The sum Σ(x) of all samples of the outputs (x) is calculated. The product (x·i) of each output (x) and an instant (i) when it is taken is also found, and the sum Σ(x·i) of all products (x·i) is calculated. The temporal center of gravity is given by $N_{peak}=\Sigma(x\cdot i)/\Sigma(x)$.

Reference will now be had to a "spatial center $M_{peak}$ of gravity". When light beams U irradiating the object at a specific instant are reflected on the surface of the object and directed to the image pickup surface, they define a vertical light-receiving range on the image pickup surface. A plurality of picture elements specified by position coordinates (i) fall within this vertical light-receiving range. The output (x) of one of these picture elements is greater than the outputs (x) of other picture elements. The spatial center $M_{peak}$ of gravity can be defined as a light-receiving position (yp) in which such a specific picture element is disposed.

The light-receiving angle θp can be found from the light-receiving position (yp). The light-emitting angle θa can be found from the position in which the thin strip of light beams U is found to be disposed at an instant when the light-receiving angle θp is found. The values of θa and θp make it possible to find the Z coordinate of the point P. The X and Y coordinates of the point P can also be found from the spatial center $M_{peak}$ of gravity, the aforesaid position of the thin strip of light beams U, and the xp coordinate of the aforesaid specific picture element.

In order to calculate the spatial center $M_{peak}$ of gravity, samples of the outputs (x) of each picture element are taken periodically for a prescribed length of time. The sum Σ(x) of all samples of the outputs (x) is calculated. The product (x·i) of each output (x) and the position coordinate (i) of the picture element from which the output (x) is taken is also found, and the sum Σ(x·i) of all products (x·i) is calculated. The spatial center of gravity is given by $M_{peak}=\Sigma(x\cdot i)/\Sigma(x)$.

Figure 1:
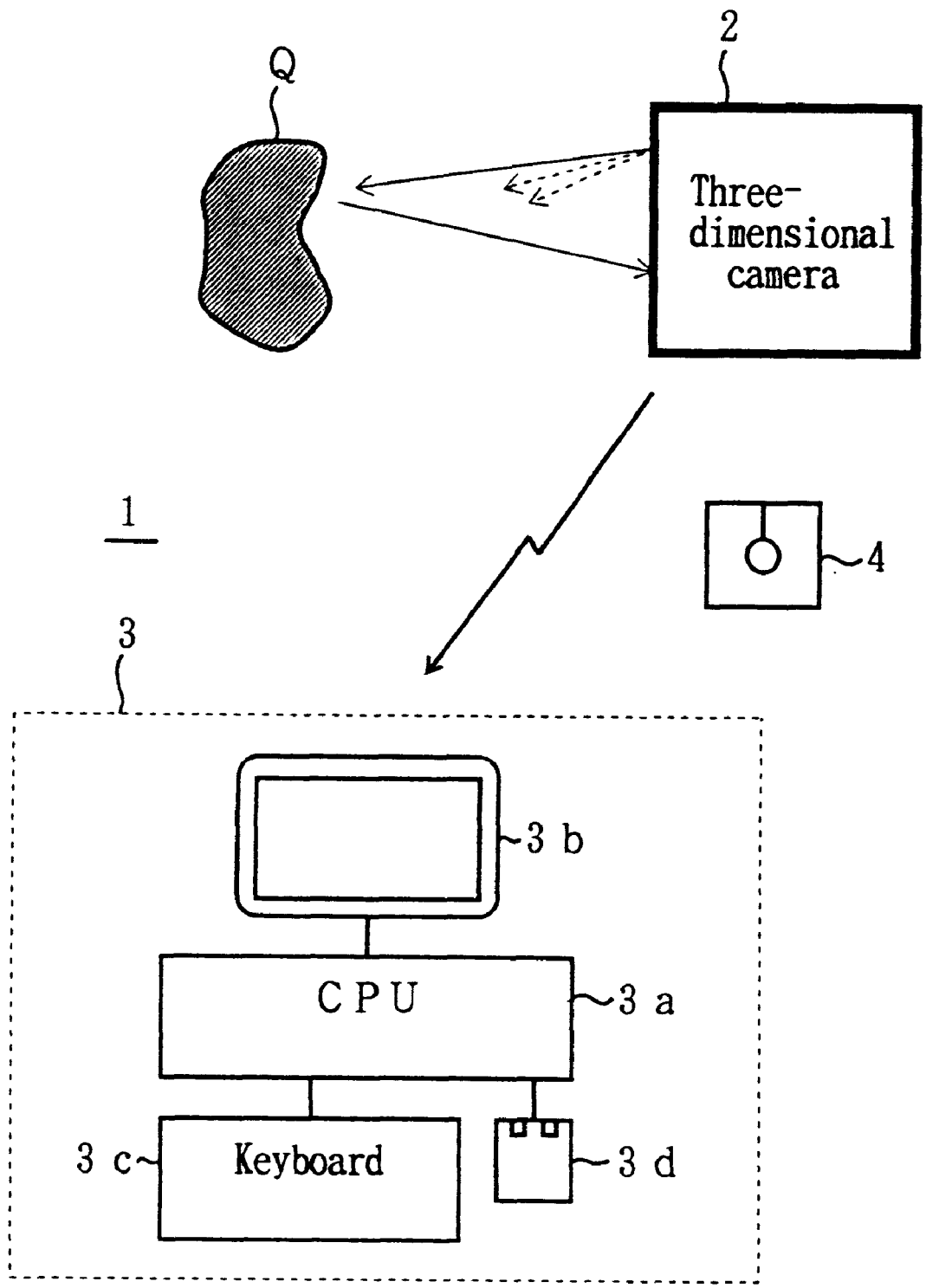
FIG. 1 is a view showing the component parts of a three-dimensional measuring system embodying this invention.

Referring now to FIG. 1, a three-dimensional measuring system 1 embodying this invention comprises a three-dimensional camera (i.e. a range finder) 2 for carrying out stereoscopic measurement by the light section method and a host computer 3 for processing output data supplied by the three-dimensional camera 2.

The three-dimensional camera 2 outputs positional information on the three-dimensional positions of a plurality of sampling points disposed on the surface of an object Q, color information on the object Q, and data required for calibration. Arithmetic operations for finding the coordinates of each sampling point by trigonometrical survey are performed by the host computer 3.

The host computer 3 comprises a CPU 3*a*, display unit 3*b*, keyboard 3*c* and mouse 3*d*. The CPU 3*a* has built-in software for processing the positional information. The three-dimensional camera 2 can be used either as on-line equipment or as off-line equipment. In the latter case, a portable recording medium 4 such as a magneto-optic disk (MO), minidisk (MD) or memory card is used to transfer data between the host computer 3 and the three-dimensional camera 2.

Referring now to FIGS. 2(*a*) and 2(*b*), the three-dimensional camera 2 has a light-emitting window 20*a* and a light-receiving window 20*b* in the front wall of a housing 20, the former being located above the latter. A thin strip of laser beams U having a thickness of w and a constant projection angle of φ measured in the transverse direction M1 is emitted from an optical unit OU provided in the housing 20, and is directed to the object Q through the light-emitting window 20a. A portion of the laser beams U reflected on the surface of the object Q are incident on the optical unit OU through the light-receiving window 20b. The optical unit OU is provided with a mechanism for adjusting the light-emitting axis and the light-receiving axis so as to allow them to sustain a proper positional relationship between each other.

Zooming buttons 25a and 25b, manual focusing buttons 26a and 26b, and a shutter button 27 are disposed on the top surface of the housing 20. As shown in FIG. 2(b), a liquid crystal display (LCD) 21, cursor buttons 22, a selector button 23, canceling button 24, analog output terminal 32, digital output terminal 33, and slot 30a arranged to receive the portable recording medium 4 are disposed at the rear of the housing 20.

The LCD 21 affords to a photographer an overall view of the object field and serves as an electronic view finder. He can set a mode of photographing as he desires by means of the buttons 22 to 24. The analog output terminal 32 can be used for outputting a two-dimensional picture signal of, e.g., the NTSC (National Television Signal Carrier) type. The digital output terminal 33 takes the form of, e.g., an SCSI (Small Computer System Interfare) terminal.

Figure 3:
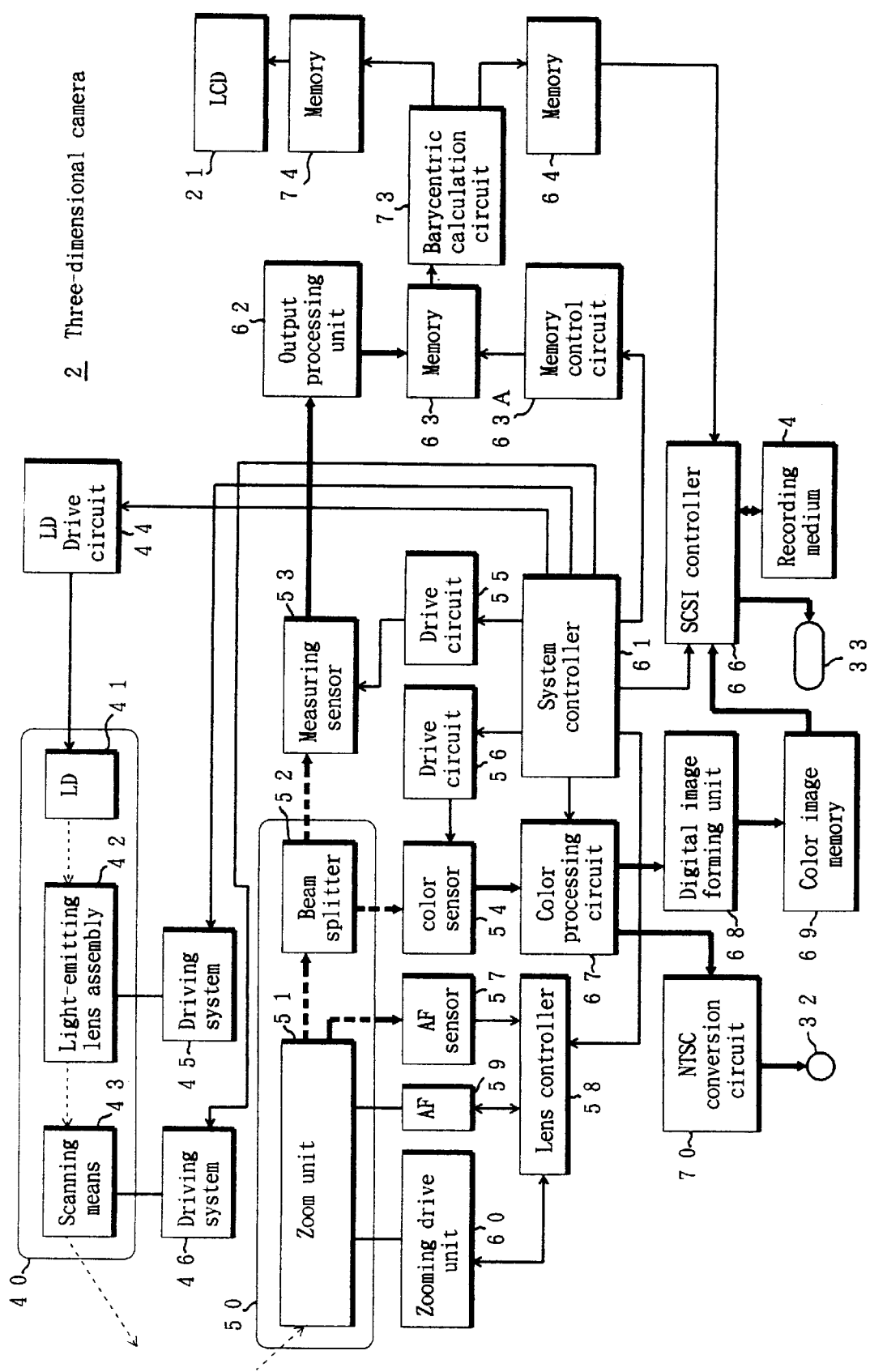
FIG. 3 is a block diagrammatic representation thereof.

Referring now to FIG. 3, a block diagrammatic representation of the three-dimensional camera 2 is shown. Electric signals are transmitted over communication buses illustrated in solid lines in the directions as indicated by arrows, while the light path with directions likewise indicated by arrows is illustrated in dashed lines.

The optical unit OU consists of a light-emitting optical system 40 and a light-receiving optical system 50. The light-emitting system 40 includes a semiconductor laser 41, which preferably takes the form of a laser diode emitting radiation with a wave length of 670 nm. A light-emitting lens assembly 42 produces a thin strip of laser beams U by allowing the laser beams emitted from the semiconductor laser 41 to travel through the lens assembly 42. The thin strip of laser beams U is pivoted by a scanning means 43, which preferably takes the form of a galvanometer mirror, in a direction which is perpendicular to a virtual plane formed by the thin strip of laser beams U. A drive circuit 44 capable to drive the semiconductor laser 41, driving systems 45 and 46 for the light-emitting lens assembly 42 and the scanning means 43 respectively are controlled by a system controller 61.

The light-receiving optical system 50 includes a zoom unit 51 by which the laser beams reflected back thereto are converged. Then the laser beams are divided by a beam splitter 52 into two fractions. One of these two fractions, the wave length of which is substantially the same as that of the radiation emitted by the semiconductor laser 41, is directed towards a measuring sensor 53. The other of the two fractions, which falls within the visible spectrum, is directed towards a monitoring color sensor 54. Both of these sensors are CCD area sensors. The zoom unit 51 is of an internal focusing type, i.e., it utilizes a portion of the incident laser beams for automatic focusing (AF), which is materialized by an AF sensor 57, lens controller 58 and focusing drive unit 59. A zooming drive unit 60 is provided for electrically-driven zooming.

Every time a drive circuit 55 generates a clock pulse, image information supplied by the measuring sensor 53 is stored in a memory 63. Every time a drive circuit 56 generates a clock pulse, image information supplied by the color sensor 54 is transmitted to a color processing circuit 67. When the image information has been subjected to color processing, it is either outputted on an on-line basis through an NTSC conversion circuit 70 and the analog output terminal 32 or stored in a color image memory 69 after quantization in a digital image forming unit 68. Then, color image data are transmitted from the color image memory 69 to an SCSI controller 66 and either outputted on an on-line basis from the digital output terminal 33 or stored in the recording medium 4 in such a manner as to be correlated with the positional information on the three-dimensional positions of a plurality of sampling points disposed on the surface of the object Q. The color image subtends the same field angle as that which is subtended by a metric image formed by the measuring sensor 53. The color image is utilized as reference information at the time when an application program is executed in the host computer 3. Two examples of specific procedures, where the color information is utilized, are as follows:

(1) A plurality of sets of the aforesaid positional information are obtained such that the visual points vary with sets. These sets of information are combined with each other so as to produce a three-dimensional model.

(2) The unnecessary apex or apexes of the aforesaid three-dimensional model are thinned out.

The system controller 61 causes a character generator (not shown) to display letters, characters and/or symbols on the screen of the LCD 21.

An output processing circuit 62 includes an amplifier for amplifying a photoelectric transfer signal outputted from each picture element g (FIG. 5(a)) of the measuring sensor 53 and an analog-to-digital converter for converting the photoelectric transfer signal into an 8-bit light-receiving data. The read/write memory 63 has a storage capacity of 200×32×33 bytes and stores light-receiving data outputted from the output processing circuit 62. A memory control circuit 63A carries out address assignment for the light-receiving data to be written into and read out of the memory 63.

A barycentric calculation circuit 73 produces a shaded image corresponding to the shape of the object Q on the basis of the light-receiving data stored in the memory 63, outputs the shaded image to a memory 74 provided just short of the LCD 21, calculates data from which the three-dimensional position of the point P (FIGS. 26(a–c)) is to be calculated, and outputs the data to a memory 64. In addition to the shaded image, the color image stored in the color image memory 69 can also be displayed on the screen of the LCD 21. The circuit arrangement scheme of the barycentric calculation circuit 73 and the manner in which it works will appear hereinafter.

FIG. 4(a) is a front view of the light-emitting lens assembly 42, and FIG. 4(b) is a side view of the same.

The light-emitting lens assembly 42 consisting of a collimator lens 421, variable lens 422 and expander lens 423 serves to produce a thin strip of laser beams U as follows: Laser beams emitted from the semiconductor laser 41 reach the collimator lens 421, travel therethrough, and are sent outward at angles that cause all of them to travel in parallel paths. Then the laser beams, with the beam radius adjusted by the variable lens 422, are expanded by the expander lens 423 in the transverse direction M1 (FIG. 2(a)).

The variable lens 422 allows the thin strip of laser beams U to be thick enough to vertically cover three picture elements or more irrespective of the field angle and the camera-to-object distance. The driving system 45 follows instructions given by the system controller 61 in moving the variable lens 422 so that the thickness w of the thin strip of laser beams U incident on the measuring sensor 53 may be maintained at a fixed value. The variable lens 422 is actuated in association with the zoom unit 51 in the light-receiving optical system 50.

Figure 2A:
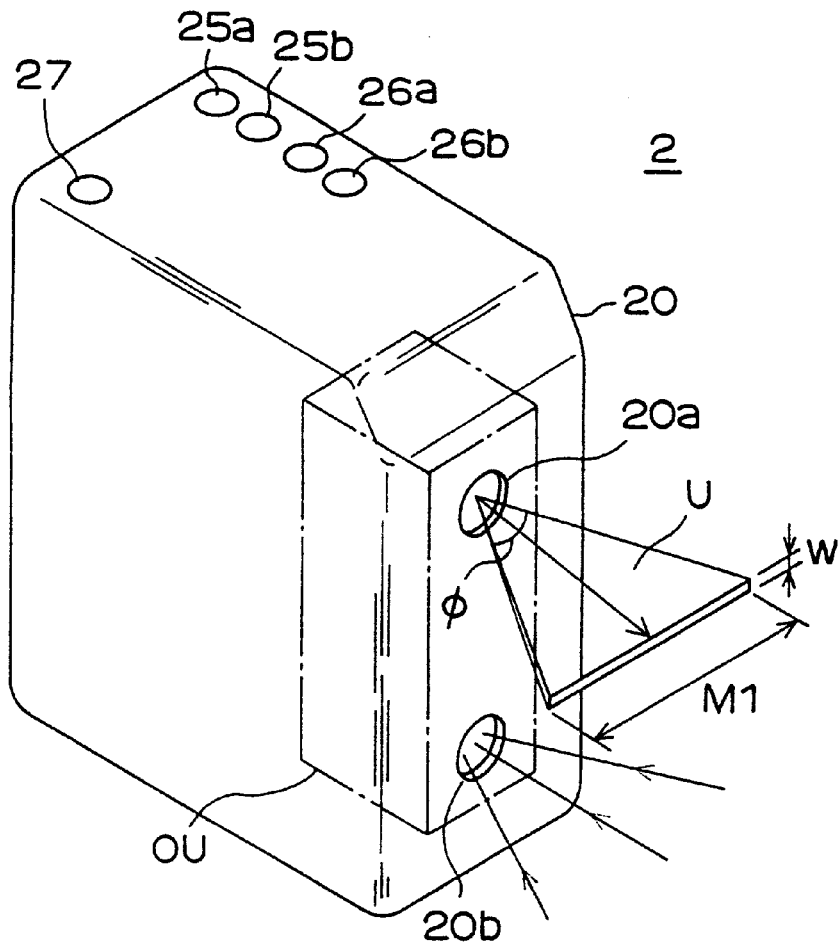
FIGS. 2(a) and 2(b) are perspective views of an illustrative example of a three-dimensional camera.
Figure 2B:
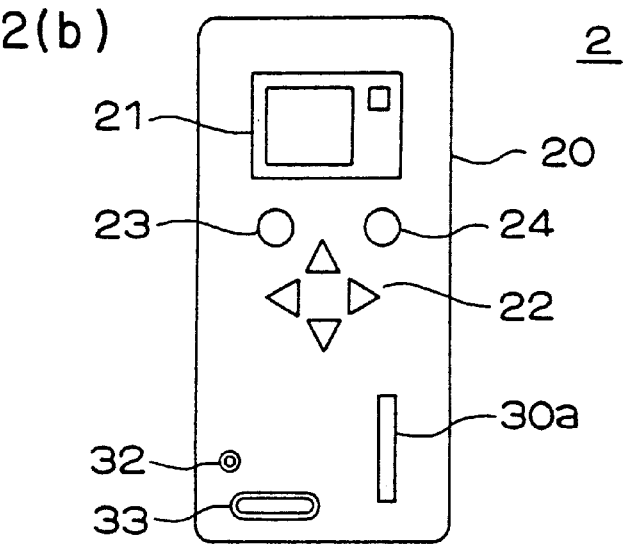

The distortion of the thin strip of laser beams U can be reduced if the projection angled (FIG. 2(a)) is enlarged before the pivotal movement of the laser beams U instead of being enlarged after the pivotal movement thereof by means of the galvanometer mirror 43. A compact arrangement of the galvanometer mirror 43 may be attained by disposing the expander lens 423 at the final stage of the light-emitting lens assembly 42, i.e., in the immediate vicinity of the galvanometer mirror 43.

FIGS. 5(a–b) show a principle on which the calculation of three-dimensional positions on the surface of the object Q is based, wherein the samples of the quantities of light incident on an image pickup surface are drawn only at five sampling times for the sake of simplicity. Like numerals and letters are employed in FIGS. 5(a–b) to designate the parts corresponding to those in FIGS. 25(a–d) and 26(a–c).

The object Q is irradiated by the thin strip of laser beams U which is thick enough to vertically cover a plurality of picture elements, e.g. five picture elements, on the image pickup surface S2 of the measuring sensor 53. The thin strip of laser beams U is pivoted at constant angular velocity such that the time required for vertically traversing a tier of picture elements corresponds to the time interval between adjacent sampling times which are designated as n−2, n−1, n , n+1 and n+2 in FIG. 5(b). Light-receiving data for each frame, i.e. information on photoelectric transfer, are outputted from the measuring sensor 53 at sampling intervals.

This embodiment is premised on an assumption that, in order to permit a temporal center $N_{peak}$ of gravity (FIG. 5(b)) to be calculated, a single specific picture element obtains light-receiving data 32 times from sampling procedures carried out 32 times. In referring to FIG. 5(a), it will be noted that one of the picture elements on the image pickup surface S2 is designated as g. The picture element g can be regarded as the base of a triangle having a substantially similar triangle on the side of the principal point O (or H') of the lens assembly opposite the image pickup surface S2. The base of this similar triangle corresponding to the base g is designated as ag. A temporal center $N_{peak}$ of gravity or a center ip of gravity (FIG. 13), which is an instant when the optical axis of the thin strip of laser beams U traverses the portion ag of the surface of the object Q, is found from the aforesaid sampling procedures.

When the object Q has a flat surface and when noise does not result from the characteristic of an optical system, the quantity of light incident on a picture element becomes large, as shown in FIG. 5(b), around an instant when the thin strip of laser beams U traverses the picture element. Ordinarily, the distribution of the quantity of light in a direction which is perpendicular to a virtual plane formed by the thin strip of laser beams U is nearly normal as shown in FIG. 5(a). FIG. 5(b) is premised on an assumption that the largest quantity of light is incident on the picture element g at the time interval between the sampling times n−1 and n. The crest of this normal distribution curve disposed therebetween nearly agrees with the temporal center $N_{peak}$ of gravity.

The position coordinates of the portion ag are calculated on the basis of the relationship between the direction in which the thin strip of laser beams U irradiates the object Q at an instant when the temporal center $N_{peak}$ of gravity is found and the direction in which a portion of the laser beams U reflected on the surface of the object Q are incident on the picture element g . The resolution of the system is vastly improved thereby.

The quantity of light incident on a picture element depends on the reflectivity of the object Q. However, the ratio of the quantity obtained at one sampling time to the quantity obtained at another sampling time is constant irrespective of the magnitude of the quantity per se. Thus the accuracy of measurement is not affected by a shade of color.

Figure 6:
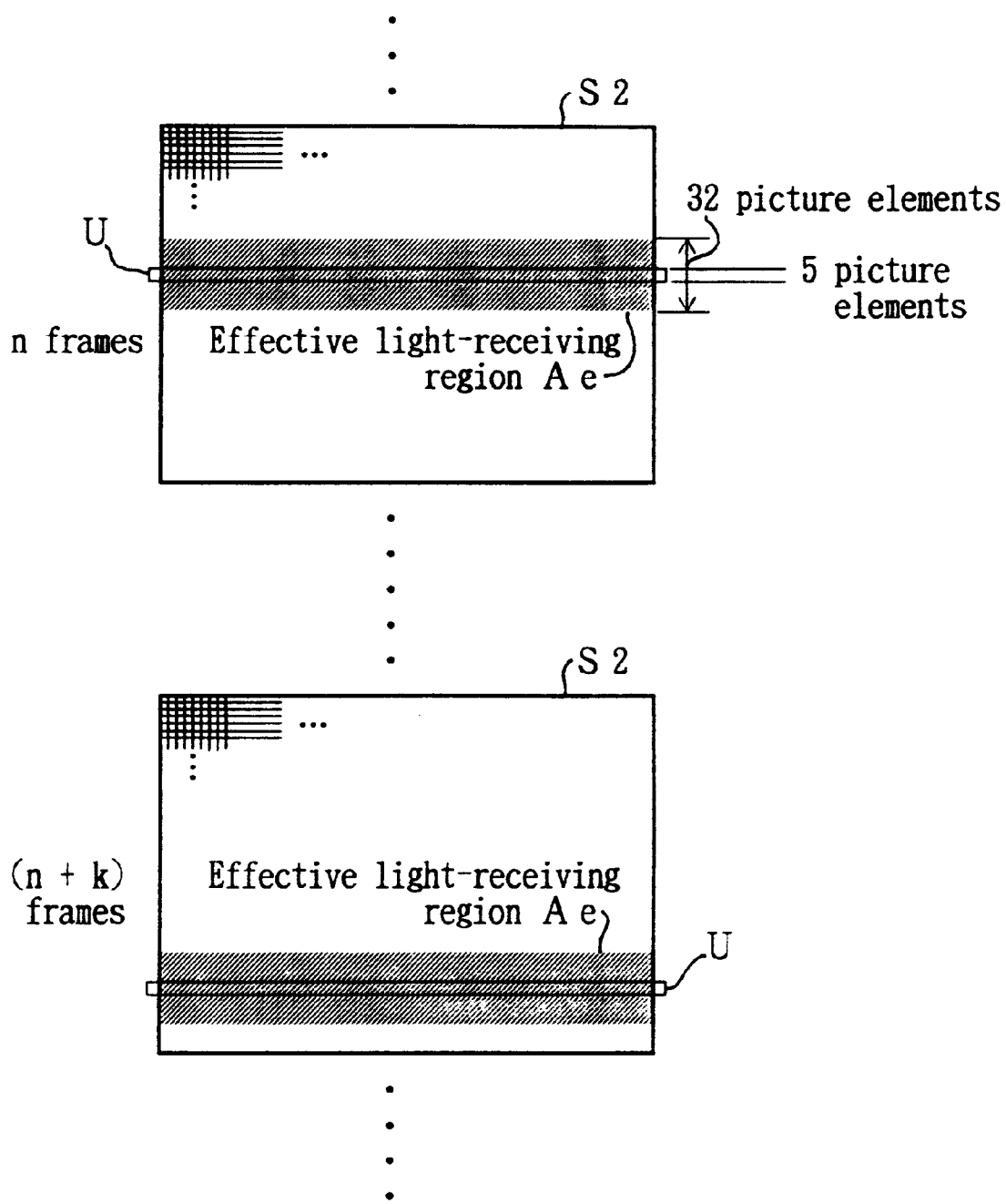
FIG. 6 is a view showing a region which can be read by a measuring sensor.

Referring now to FIG. 6, a region which can be read by the measuring sensor 53 does not cover the whole of the image pickup surface S2 but only a beltlike portion thereof so as to make it possible to carry out high-speed measurement. This beltlike portion is hereinafter referred to as an "effective light-receiving region Ae". As the thin strip of laser beams U is pivoted, the effective light-receiving region Ae moves in the vertical direction, always vertically covering 32 picture elements so as to ensure a measurable range d' (FIG. 16) within which the object Q falls at any instant. The technique for reading only a portion of an image out of a CCD area sensor is disclosed in Japanese Laid Open Patent Application No. 7-174536.

Figure 7A:
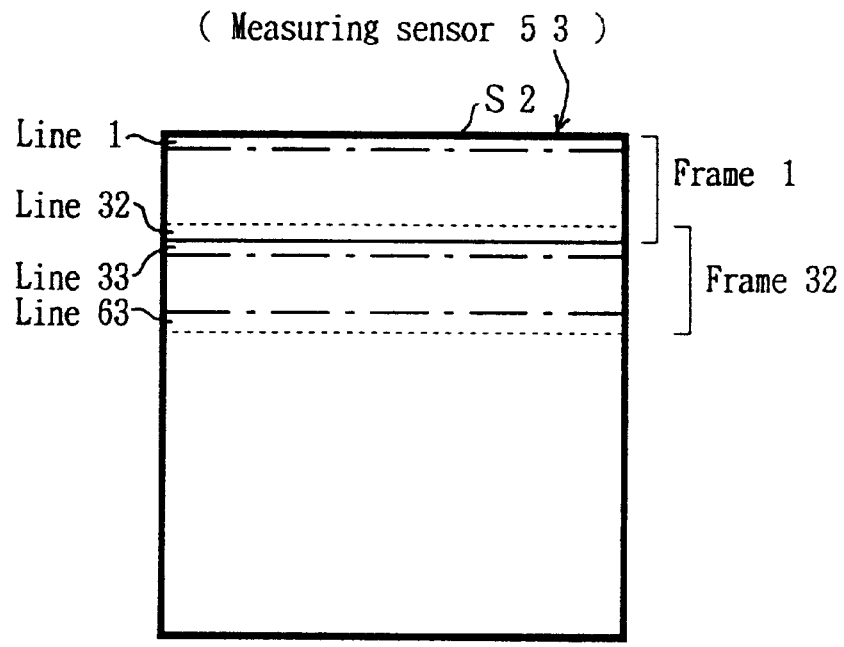
FIGS. 7(a) and 7(b) are views showing the relationship between the lines and the frames on the image pickup surface thereof.
Figure 7B:
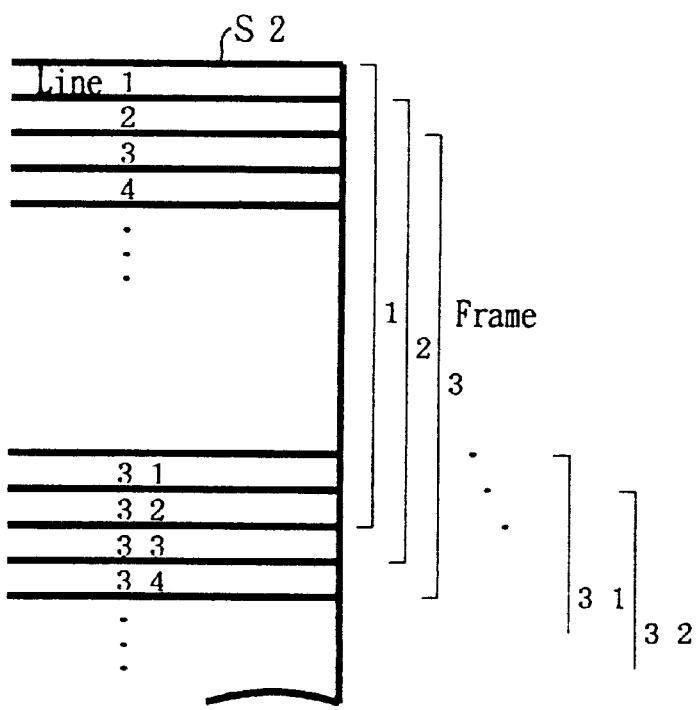

Referring now to FIGS. 7(a–b), the image pickup surface S2 has a plurality of frames, each of which has 32 lines. Since each line has 200 picture elements, each frame has 32×200 picture elements. Lines provided on the frame 1 bear serial numbers 1 to 32. Lines provided on the frame 2 bear serial numbers 2 to 33. Lines provided on the frame 3 bear serial numbers 3 to 34. From such a numbering system, it will be apparent that lines provided on the frame 32 bear serial numbers 32 to 63.

Figure 8:
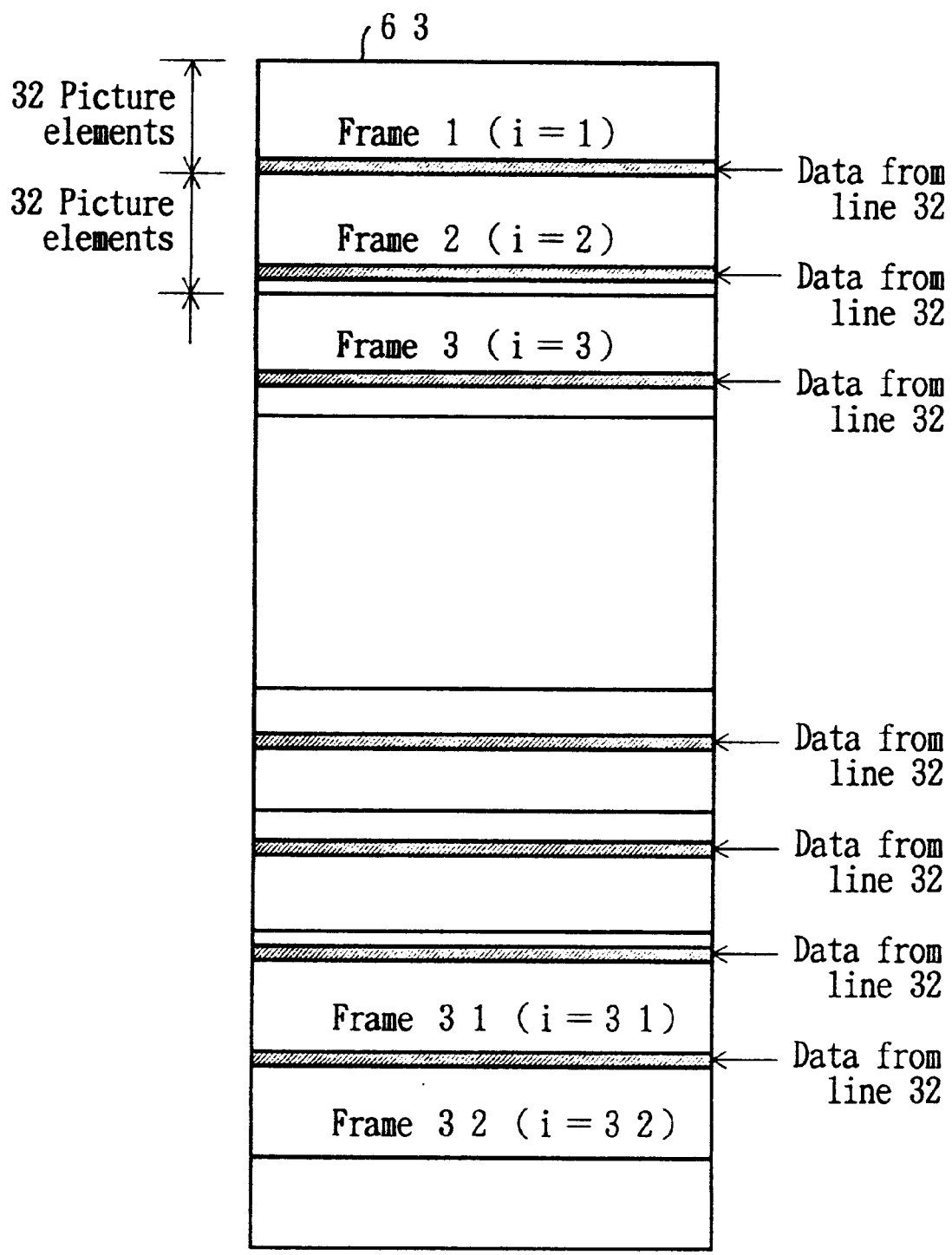
FIGS. 8 to 10 are views showing the memory location of data on the light incident on each frame.

The light-receiving data outputted from the frames 1 to 32 are transmitted one after another to the memory 63 through the output processing circuit 62 and stored in the memory 63 in numerical order of the frames as shown in FIG. 8. From the aforesaid numbering system, it will be apparent that the line 32 is included in all the frames 1 to 32 such that it is the lowest line in the frame 1, the second line from the lowest in the frame 2, and so forth. When the light-receiving data outputted from the frames 1 to 32 have been stored in the memory 63, the temporal center $N_{peak}$ of gravity is calculated from the outputs of picture elements provided on the line 32.

Figure 9:
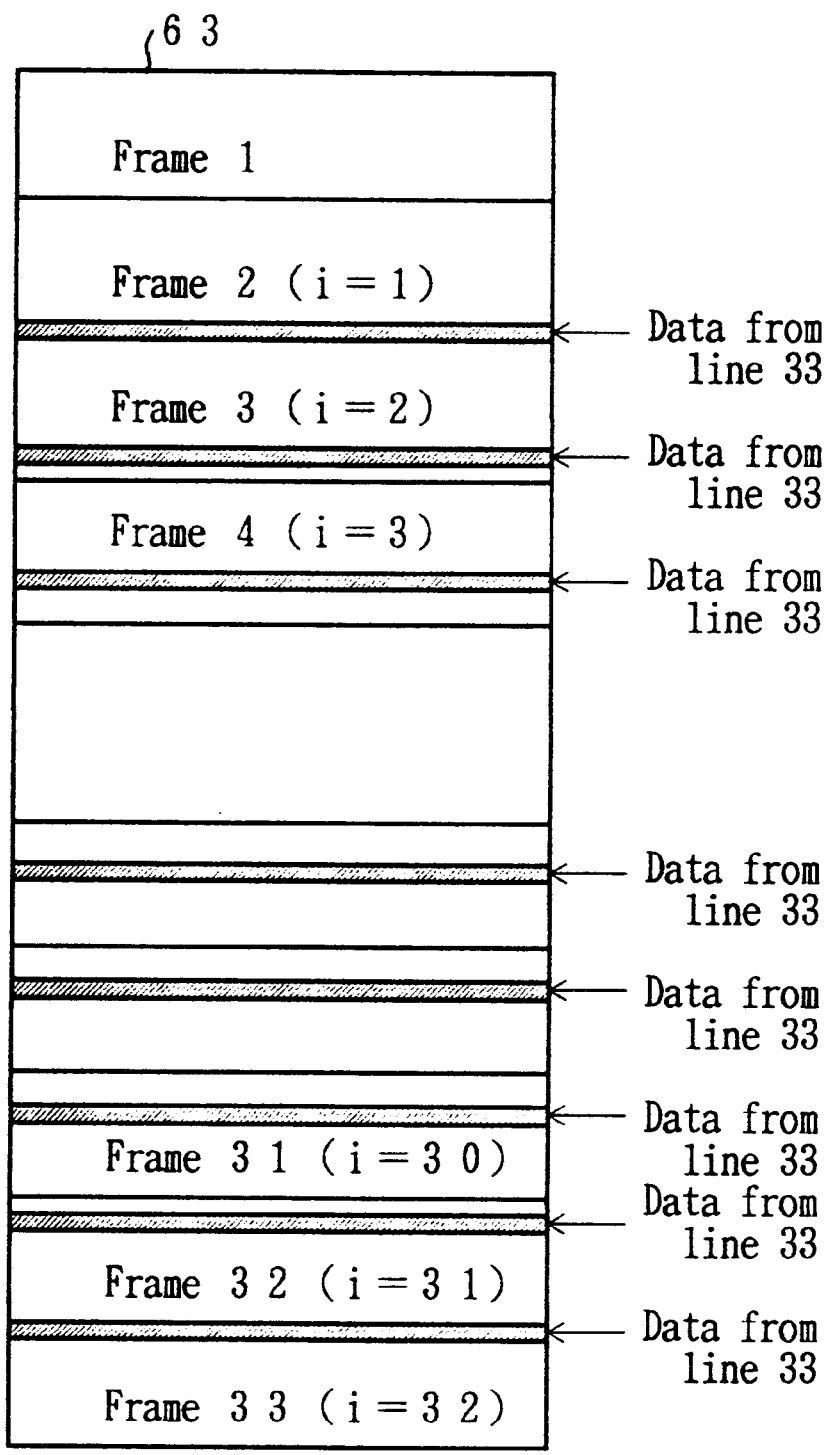

During the calculation of the outputs of picture elements provided on the line 32, the light-receiving data outputted from the frame 33 are transmitted to the memory 63 and stored therein. As shown in FIG. 9, the storage region for these data is disposed right beneath the storage region for the light-receiving data outputted from the frame 32. When the light-receiving data outputted from the frame 33 have been stored in the memory 63, the temporal center $N_{peak}$ of gravity is calculated from the outputs of picture elements provided on the line 33 included in all the frames 2 to 33.

Figure 10:
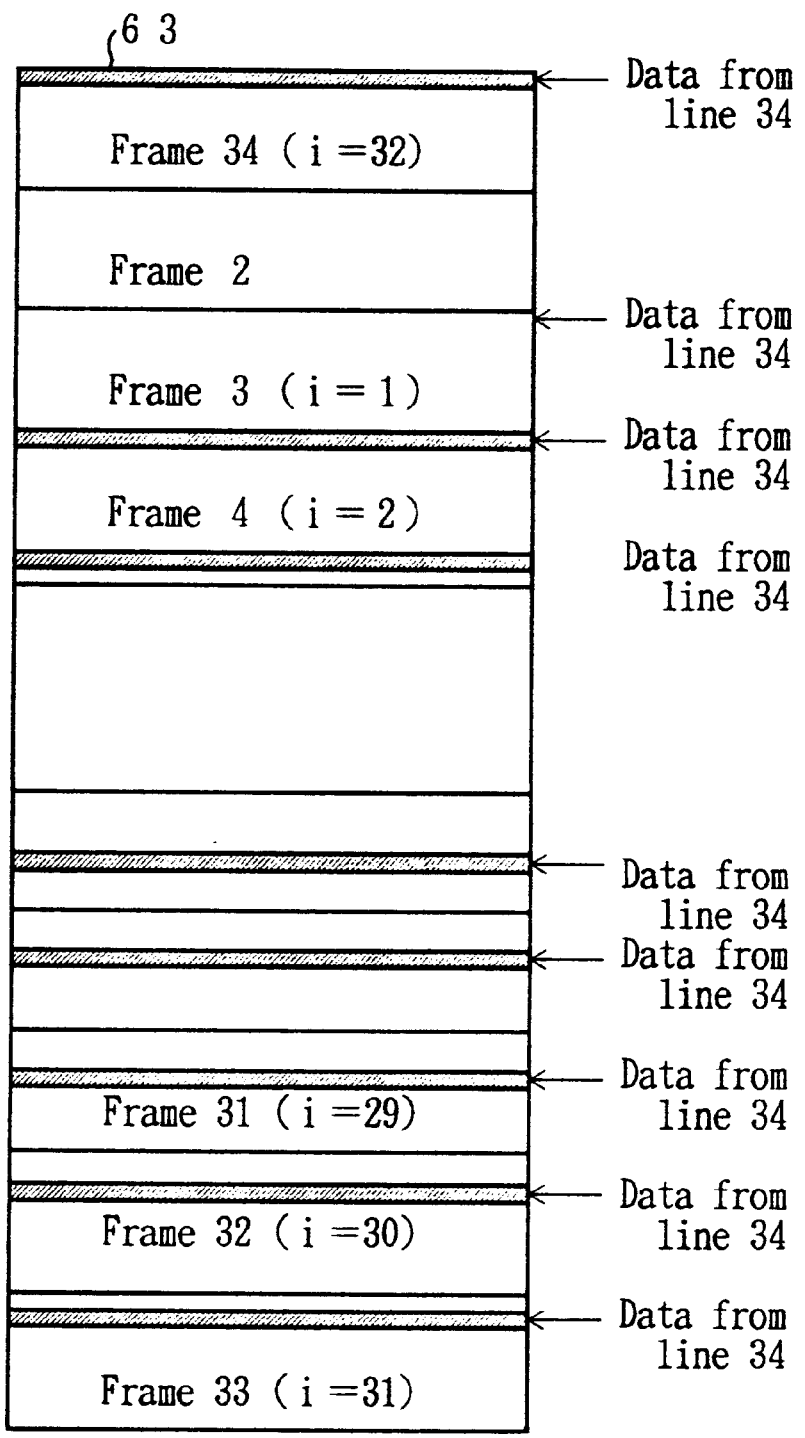

During the calculation of the outputs of picture elements provided on the line 33, the light-receiving data outputted from the frame 34 are transmitted to the memory 63 and stored therein. As shown in FIG. 10, these data are overwritten on the light-receiving data outputted from the frame 1. Since the latter data have already been processed, it is justifiable to erase them by overwriting. When the light-receiving data outputted from the frame 34 have been stored in the memory 63, the temporal center $N_{peak}$ of gravity is calculated from the outputs of picture elements provided on the line 34. When the light-receiving data outputted from the frame 34 have been processed, the light-receiving data outputted from the frame 35 are overwritten on the light-receiving data outputted from the frame 2.

In this manner, the temporal centers $N_{peak}$ of gravity are calculated from the outputs of picture elements provided on a total of 200 lines, the last line to be subjected to the calculation being the line 231.

Since new light-receiving data are overwritten on old disused ones, the memory 63 has only to have a low storage capacity.

Figure 11:
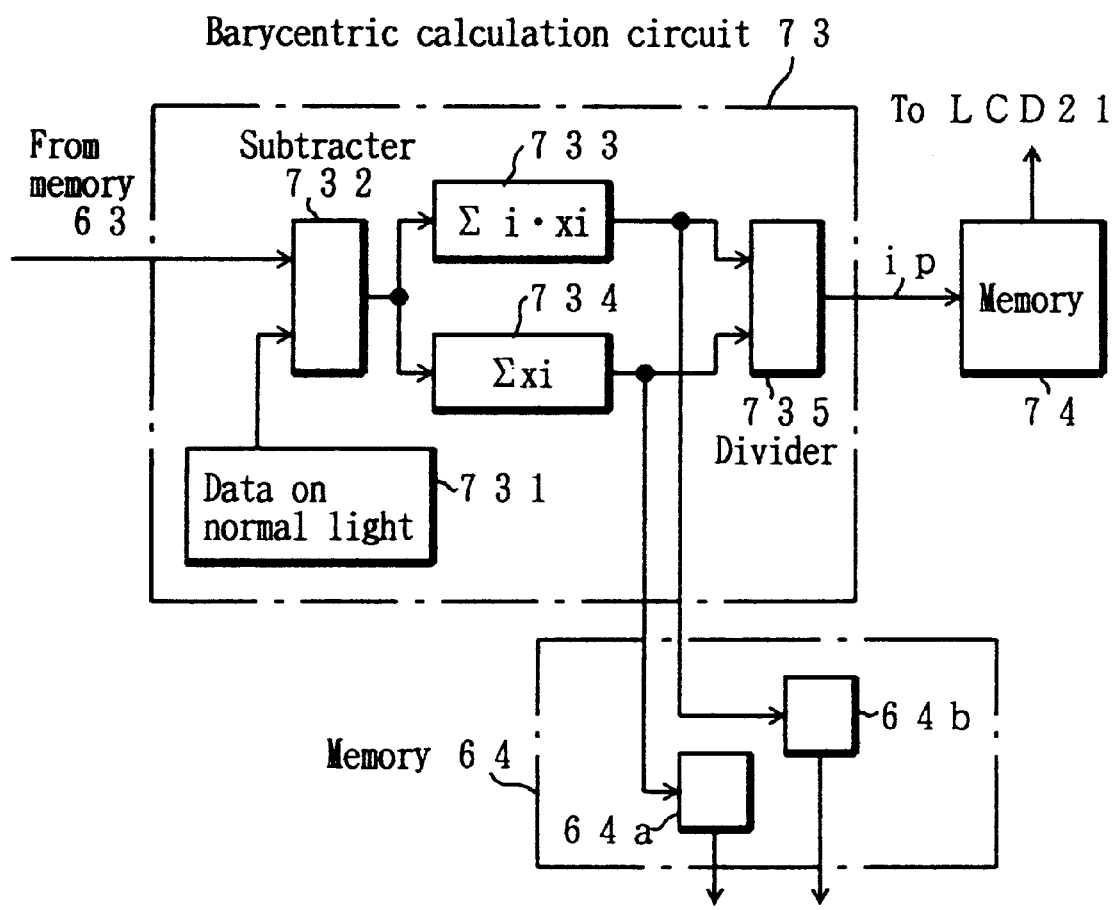
FIG. 11 is a block diagrammatic representation of a barycentric calculation circuit.
Figure 12:
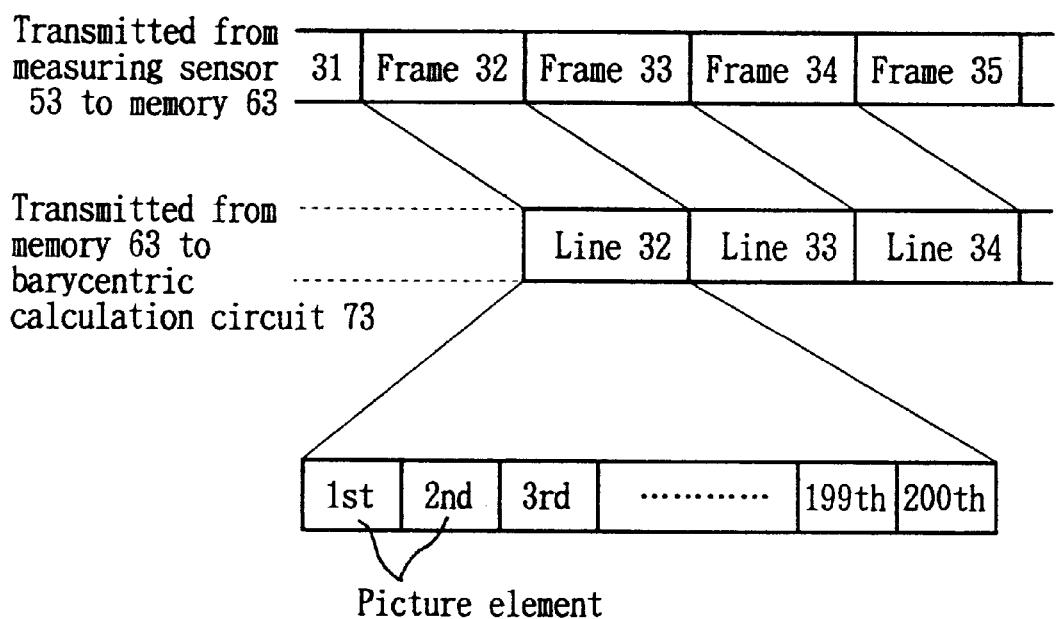
FIG. 12 is a schematic illustration to help explain the timing of data transfer.
Figure 13:
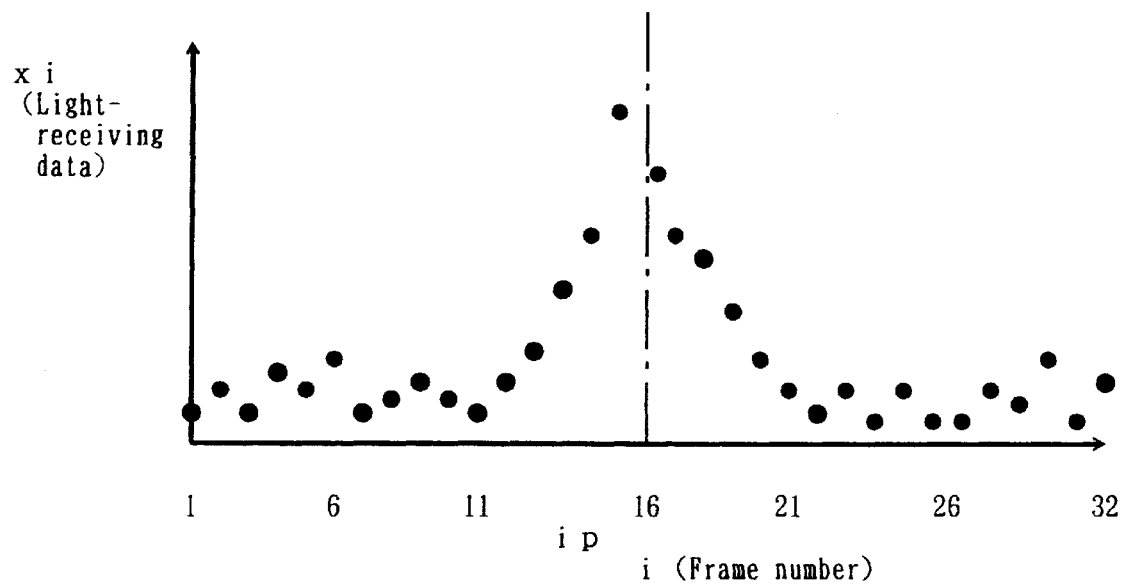
FIG. 13 is a schematic illustration to help explain the temporal center of gravity.

Referring in more detail to the circuit arrangement scheme of the barycentric calculation circuit 73 and the calculation of the temporal center $N_{peak}$ of gravity, reference should be made to FIGS. 11 to 13.

As shown in FIG. 13, the temporal center $N_{peak}$ of gravity is obtained from 32 light-receiving data which in turn are obtained from 32 picture elements respectively. For obtaining 32 light-receiving data, sampling procedures are carried out 32 times. Sample numbers 1 to 32 are given respectively to these 32 data, of which the ith data is designated as xi, where i is any of integers 1 to 32 and represents a serial number borne by a frame which happens to be the effective light-receiving region Ae at a given instant and within which a picture element outputting xi falls.

The center ip of gravity to be obtained from x1 to x32 is given by $$ip = \frac{\sum_{i=1}^{32} i \cdot xi}{\sum_{i=1}^{32} xi}$$

The barycentric calculation circuit 73 calculates the center ip of gravity (i.e. the temporal center $N_{peak}$ of gravity) for each picture element on the basis of a difference provided by subtracting a data ks on normal light from a data read out of the memory 63. When the difference is negative, 0 is used in place of the actual value of the difference.

The data ks on normal light is calculated on the basis of light-receiving data obtained from the picture elements in the absence of laser beams U. The data ks on normal light may be predetermined as a fixed value, which may be "5", "6" or "10" when 8 bits (having 256 scales) are outputted from the measuring sensor 53. Alternatively, the data ks on normal light may be found on a real-time basis from data outputted from the measuring sensor 53. In this case, an average value is formed from two light-receiving data obtained from two picture elements disposed right over or right beneath the effective light-receiving region Ae. Since laser beams U are not incident on these two picture elements, light-receiving data obtained from these two picture elements meet the requirement for the data ks on normal light. Instead of using light-receiving data obtained from two picture elements, it is also possible to use a light-receiving data obtained from a single picture element disposed right over or right beneath the effective light-receiving region Ae. According to the shape of the object Q or noise contributed to the light-receiving data, an extra value such as 5 added to the data ks on normal light may minimize or eliminate noise interference more reliably. From the foregoing, it will be apparent that 36, 34 or 33 lines are taken into account in calculating the data ks on normal light, although the center ip of gravity is calculated from 32 data obtained from 32 lines.

As shown in FIG. 11, the barycentric calculation circuit 73 comprises a memory 731 for storing the data ks on normal light, subtracter 732, first adder 733, second adder 734 and divider 735. Although calculation is materialized by software, it is also possible to carry out calculation in whole or in part by means of hardware.

The memory 731 stores the data ks on normal light. The subtracter 732 subtracts the data ks from the light-receiving data fed thereto. A data outputted therefrom is the aforesaid light-receiving data xi. In the first adder 733, the sum of all terms of i·xi from i equals one to i equals 32 is calculated and outputted. In the second adder 734, the sum of all terms of xi from i equals one to i equals 32 is calculated and outputted. The output values obtained from the first and second adders 733 and 734 are fed to the divider 735 on one hand, and stored in memories 64b and 64a respectively on the other hand. In the divider 735, the output value obtained from the first adder 733 is divided by the output value obtained from the second adder 734. The output of the divider 735 is the center ip of gravity, which is stored in the memory 74 provided just short of the LCD 21. Data stored in the memories 64a and 64b are either outputted from the digital output terminal 33 to the host computer 3 through the SCSI controller 66 or stored in the recording medium 4. In order to find the three-dimensional positions of points disposed on the surface of the object Q, arithmetic operations are performed in the host computer 3 on the basis of data outputted from the digital output terminal 33. The reliability of these data is also estimated in the host computer 3.

In order to allow the barycentric calculation circuit 73 to carry out the aforesaid processing, the memory control circuit 63A carries out address assignment for each picture element in the memory 63 as shown in FIG. 12. For example, the addresses of 32 data obtained from the first picture elements in the 32nd lines contained in the frames 1 to 32 are assigned in order of serial numbers borne by the frames. During the arithmetic operations performed in the barycentric calculation circuit 73 with respect to the light-receiving data outputted from the frames 1 to 32 and read out of the memory 63, the light-receiving data outputted from the frame 33 are transmitted to the memory 63. In this manner, light-receiving data are read out of the memory 63 in parallel with another light-receiving data being written thereinto to the end that the working of the barycentric calculation circuit 73 is rendered efficient.

The divider 735 outputs a center ip of gravity when 32 data obtained from the first picture elements in the 32nd lines contained in the frames 1 to 32 have been fed to the barycentric calculation circuit 73. Then, 32 data obtained from the second to 200th picture elements respectively are processed likewise. Then, 32 data obtained from the 33rd to 231st lines respectively are processed likewise so that all of the 200 lines may be subjected to the calculation of the centers ip of gravity.

The measuring sensor 53 is a CCD area sensor having a domain of integration and a domain of storage. When integral action in the domain of integration is completed, electric charge is transmitted to the domain of storage, from which image information is outputted.

The centers ip of gravity stored in the memory 74 are displayed on the screen of the LCD 21. The magnitude of a center ip of gravity has relevance to the position of a point disposed on the surface of the object Q. A center ip of gravity representing the position of a point disposed at a short distance from the three-dimensional camera 2 assumes a large value, while a center ip of gravity representing the position of a point disposed at a long distance therefrom assumes a small value. Therefore, the centers ip of gravity will be found particularly advantageous when used as a data on light and shade in producing a shaded image.

The procedures for measurement and the manner in which the three-dimensional camera 2 and the host computer 3 work will now be described on the assumption that the number of frames is 231 and the number of picture elements provided on the image pickup surface S2 is 200×262, where 262 is the number of picture elements counted in the direction in which the thin strip of laser beams U is Pivoted.

The three-dimensional camera 2 is arranged in position. The photographer sets a field angle with the aid of a monitor picture displayed on the screen of the LCD 21. As occasion demands, the zoom unit 51 is operated. The three-dimensional camera 2 does not subject the color sensor 54 to the adjustment of a diaphragm but allows an electronic shutter to control exposure so that the quantity of light incident on the measuring sensor 53 may be made as large as possible with the diaphragm opened.

Figure 14:
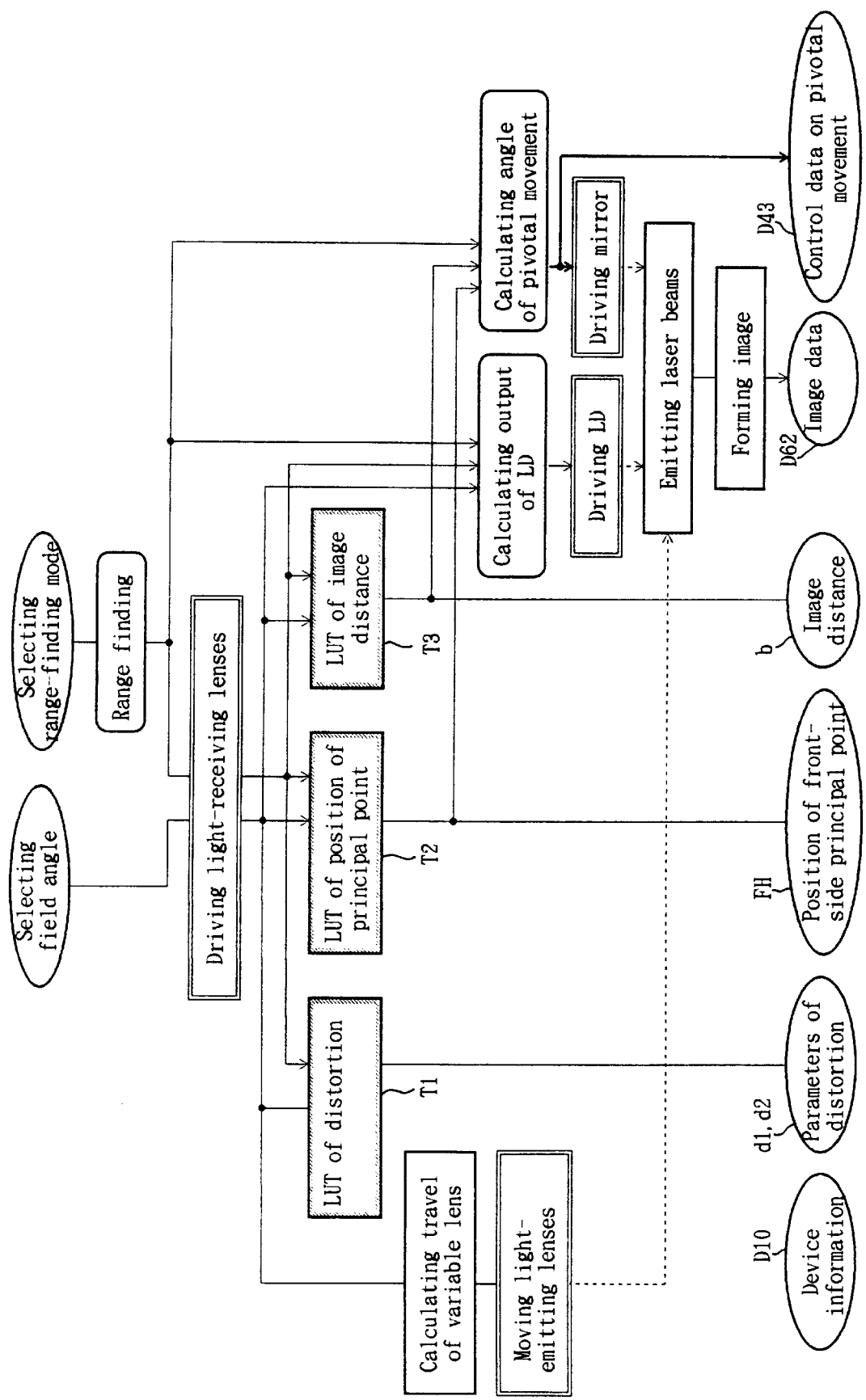
FIG. 14 is a view showing the data flow in the three-dimensional camera.
Figure 15:
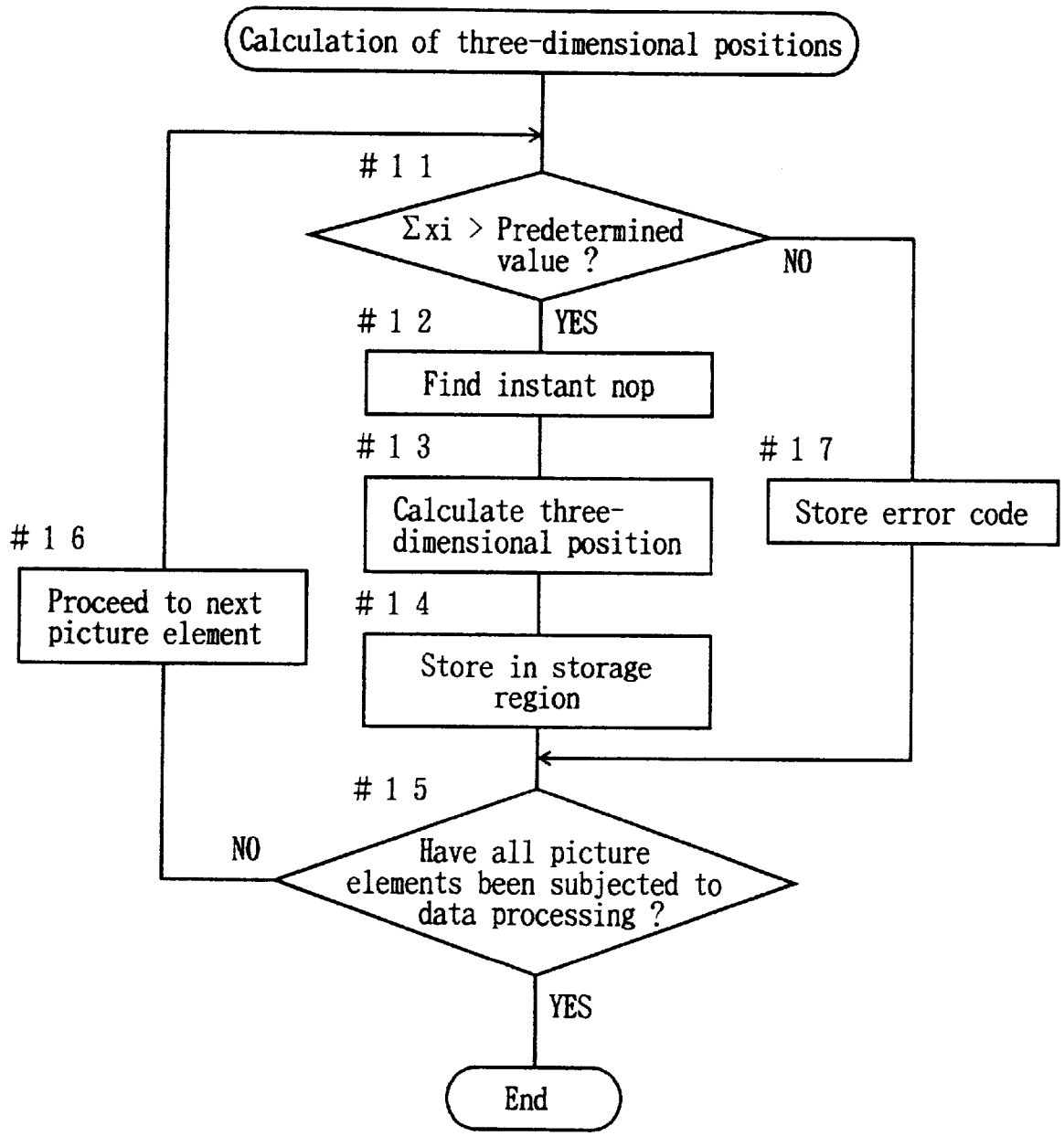
FIG. 15 is a flow diagram representing successive steps in a typical procedure to be carried out in a host computer for calculating the three-dimensional positions of points disposed on the surface of an object.
Figure 16:
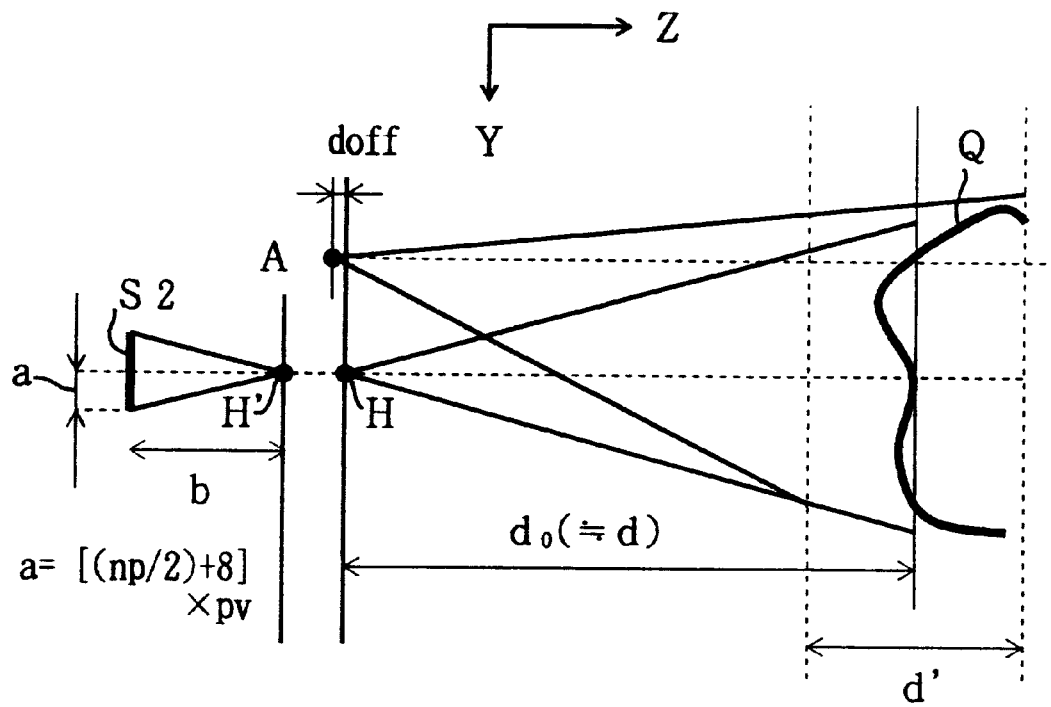
FIG. 16 is a view showing the relationship between the object and various points on or in the optical systems.

FIG. 14 is a view showing the data flow in the three-dimensional camera 2. FIG. 15 is a flow diagram representing successive steps in a typical procedure to be carried out in the host computer 3 for calculating the three-dimensional positions of points disposed on the surface of the object Q. FIG. 16 is a view showing the relationship between the object Q and various points on or in the optical systems.

The zoom unit 51 includes a variable lens 514 and a focusing lens 512. The variable lens 514 is caused to move in accordance with the field angle selected by the photographer. An approximate camera-to-object distance do (FIG. 16) is measured during manual or automatic focusing effected by moving the focusing lens 512.

In accordance with the movement of lenses in the zoom unit 51, the travel to be covered by the variable lens 422 in the light-emitting lens assembly 42 is calculated by an arithmetic circuit (not shown), and the variable lens 422 is caused to move in accordance with the result of the calculation.

The system controller 61 reads the outputs Ed and fp of a focusing encoder 59A (FIGS. 4(a–b)) and a zooming encoder 60A respectively through the lens controller 58. The output Ed denotes an amount of shift of a lens, and the output fp denotes a zoom control value. In the system controller 61, the outputs Ed and fp of the two encoders are compared with logical unit tables (LUT's) T1, T2 and T3 (FIG. 14) of distortion, position of principal point and image distance respectively. Data on the conditions of photographing suitable for the outputs Ed and fp are produced and fed to the host computer 3. Three data on the conditions of photographing are enumerated in FIG. 14. They are parameters of distortion (i.e. correction factors d1 and d2 for correcting the distortion of lenses), position FH of front-side principal point and image distance b, which are derived from LUT's T1, T2 and T3 respectively. By the expression "position FH of front-side principal point" as used herein is meant a distance between the front-side end point F and the front-side principal point H of the zoom unit 51. Since the front-side end point F is a fixed point, the front-side principal point H can be specified by the position FH of the front-side principal point.

The system controller 61 calculates the output of the semiconductor laser 41 (i.e. the intensity of laser radiation), the angles θa (FIG. 26(b)) made by the thin strip of laser beams U at the instants when the scanning is commenced and terminated respectively, and an angular velocity at which the thin strip of laser beams U is pivoted.

More specifically stated, the angle θa at which pulsed laser beams for calculating the intensity of laser radiation are to be emitted is set in such a manner that the pulsed laser beams reflected on the surface of a virtual vertical plane assumed to be disposed at an approximate camera-to-object distance $d_o$ are received by the measuring sensor 53 in the middle portion thereof.

With respect to the intensity of laser radiation, it should be noted that there will be some cases where the three-dimensional measuring system embodying this invention is used for measuring a human body contour. Therefore, utmost precautions should be exercised for the safety of those who undergo the measurement. The calculation of intensity of laser radiation begins with pulsed laser beams emitted at the lowest intensity of $LD_{min}$. The system controller 61 fetches the output signal $S_{on}(LD_{min})$ developed by the measuring sensor 53. A temporary intensity LD1 of laser radiation to be set for the succeeding procedures is given by $$LD1 = LD_{min} \times S_{typ}/MAX[S_{on}(LD_{min})]$$

where $S_{typ}$=normal value of intensity

Then, pulsed laser beams are emitted at an intensity of LD1. The system controller 61 fetches the output signal $S_{on}(LD1)$ developed by the measuring sensor 53. If the signal $S_{on}(LD1)$ is just or approximately equal to $S_{typ}$, LD1 is determined as the intensity LDs of laser radiation. Otherwise, LD1 and $MAX[S_{on}(LD1)]$ are used for setting another temporary intensity LD1, and the output of the measuring sensor 53 is compared with $S_{typ}$. Thus, until the output of the measuring sensor 53 comes to fall within a tolerance, the setting of a temporary intensity of laser radiation and a checkup on the propriety thereof are repeated. The measuring sensor 53 is allowed to receive the pulsed laser beams from the whole of the image pickup surface S2. This is because the distances calculated by automatic focusing are not accurate enough to eliminate a difficulty in estimating the three-dimensional positions of points disposed on the surface of the object Q. Reset time required by CCD's in the measuring sensor 53 is equivalent to the time (e.g. 1/60 second) required for scanning a field, which is longer than the reset time required on the occasion of actual measurement. Pulsed laser beams serve to make the output of the measuring sensor 53 equivalent to that which is produced on the occasion of actual measurement.

Then a camera-to-object distance d is calculated by a trigonometrical survey based on the angle θa and the three-dimensional position of the point P (FIG. 26(b)) found at the instant when the intensity of laser radiation is determined.

Lastly, the angle th1 made by the thin strip of laser beams U at the instant when the scanning is commenced, the angle th2 made by the thin strip of laser beams U at the instant when the scanning is terminated, and the angular velocity ω at which the thin strip of laser beams U is pivoted are calculated on the basis of the camera-to-object distance d. For this calculation, an offset $d_{off}$ (FIG. 16), which is present in the direction of the Z axis between the luminescent spot A and the front-side principal point H, is taken into account. Furthermore, th1 and th2 are determined such that they allow more laser beams U to be incident on the image pickup surface S2 than actually required for barely forming an image of the object Q. The excess laser beams U thus allowed to be incident on the image pickup surface S2 may vertically cover, e.g., 8 picture elements so as to ensure the measurable range d'. The values of th1, th2 and ω are given by $$th1 = \tan^{-1}[\beta \times pv(np/2+8+L)/(d+d_{oof})] \times 180/\eta$$

$$th2 = \tan^{-1}[\beta \times pv(np/2+8+L)/(d+d_{oof})] \times 180/\eta \quad \omega = (th1-th2)/np$$

where

β=magnification, i.e. d divided by effective focal length pv=distance between centers of vertically adjacent picture elements np=effective number of picture elements counted in vertical direction L=length of base line AO (FIG. 26(b))

Now the object Q begins to be scanned. Data D62 (FIG. 14) are stored in the memory 64 through the output processing circuit 62, memory 63 and barycentric calculation circuit 73 and fed to the host computer 3. Device information D10 including the aforesaid values and specifications for the measuring sensor 53 are also fed to the host computer 3. These data to be fed from the three-dimensional camera 2 to the host computer 3 are given in Table 1.

the light-receiving data outputted from the frame 33 have been stored in the memory 63, the center ip of gravity is calculated from the outputs of picture elements provided on the line 33. At the time of this calculation, "33" is added to the center ip of gravity. In place of these values which read up by one count every time the light-receiving data outputted from a new frame are used for the calculation of the center ip of gravity, any other value may be appropriate, because suitable values of the 1 and the 4 contained in the

TABLE 1

| | Data item | Range of values |
| --- | --- | --- |
| Positional -information | $\Sigma x_i$    200 × 200 × 13 bit $\Sigma i \cdot x_i$    200 × 200 × 18 bit | |
| Conditions of -photographing | Image distance b | 0.000~200.000 |
| | Position FH of front-side principal point | 0.00~300.00 |
| | Angle th1 at the start of scanning | |
| | Angular velocity $\omega$ | |
| Device -information | Nuinber of picLure elernents (in directions of X & Y axes) | 1~ |
| | Distances pu & pv between centers of horizontally & vertically adjacent picture elements | ~0.00516~ |
| | Attitudes of light-emitting assembly (on X,Y,Z axes) | 0.00~190.00 |
| | Attitudes of light-emitting assembly (in directions of X,Y,Z axes) | 0.00~300.00 |
| | Correction factors d1 & d2 for correcting lens distortion | |
| | Positions u0 & v0 of central picture elements as viewed horizontally & vertically | 0.00~256.00 |
| Two-dimensional -image | R plane 512 × 512 × 8bit | 0~255 |
| | G plane 512 × 512 × 8bit | 0~255 |
| | B plane 512 × 512 × 8bit | 0~255 |

For a more complete understanding of the successive steps in typical arithmetic operations to be performed in the host computer 3 for finding the three-dimensional positions (i.e. the X, Y and Z coordinates) of 200×200 samppling points P disposed on the surface of the object Q, reference may be had to FIG. 15.

The arithmetic operations begin with passing a judgment on whether or not a sum $\Sigma(xi)$ supplied by the three-dimensional camera 2 is greater than a predetermined value (step 11). A sum $\Sigma(xi)$ which does not come up to a predetermined standard indicates that it contains a large error. A picture element from which such a sum $\Sigma(xi)$ is obtained is excepted from the calculation of the three-dimensional positions. An error code is set for such a picture element and stored (step 17). Only the sums $\Sigma(xi)$ which are greater than the predetermined value are used for the calculation of the three-dimensional positions.

Prior to the calculation of the three-dimensional positions, an instant when the thin strip of laser beams U traverses a picture element is calculated (step 12). This instant, which is designated as "nop" in the equation (6) appearing hereinafter, is calculated by adding a serial number borne by a line to the center ip of gravity (i.e. the temporal center $N_{peak}$ of gravity) found from the calculation of $\Sigma(i \cdot xi)/\Sigma(xi)$ from i equals one to i equals 32.

By adding a serial number borne by a line to the center ip of gravity, an instant when the thin strip of laser beams U traverses a picture element is correlated with time elapsing after the instant when the scanning is commenced. As aforesaid, when the light-receiving data outputted from the frames 1 to 32 have been stored in the memory 63, the center ip of gravity is calculated from the outputs of picture elements provided on the line 32. At the time of this calculation, "32" is added to the center ip of gravity. When equation (6) appearing hereinafter can be set by calibration at the time of the calculation of the three-dimensional positions.

Then a three-dimensional position is calculated (step 13) and stored in a storage region corresponding to the picture element involved (step 14). The similar procedure is repeated for the next picture element (step 16). The arithmetic operations come to an end when all the picture elements have been subjected to data processing (i.e., when an affirmative answer has been given in step 15).

The following is a resume of a typical method of calculating the three-dimensional position:

The line of sight of a camera is given by $$(u-uO)=(xp)=(b/pu)\times[X/(Z-FH)] \quad (4)$$

$$(v-vO)=(yp)=(b/pv)\times[Y/(Z-FH)] \quad (5)$$

where b=image distance

FH=position of front-side principal point pu=distance between centers of horizontally adjacent picture elements pv=distance between centers of vertically adjacent picture elements u=position of picture element as viewed horizontally uO=position of central picture element as viewed horizontally v=position of picture element as viewed vertically vO=position of central picture element as viewed vertically The virtual plane formed by the thin strip of laser beams U is given by $$\begin{bmatrix} \cos(the3) & -\sin(the3) & 0 \\ \sin(the3) & \cos(the3) & 0 \\ 0 & 0 & 1 \end{bmatrix} \begin{bmatrix} \cos(the2) & 0 & \sin(the2) \\ 0 & 1 & 0 \\ -\sin(the2) & 0 & \cos(the2) \end{bmatrix}$$

$$\cdot \begin{bmatrix} 1 & 0 & 0 \\ 0 & \cos(the1 + the4 \cdot nop) & -\sin(the1 + the4 \cdot nop) \\ 0 & \sin(the1 + the4 \cdot nop) & \cos(the1 + the4 \cdot nop) \end{bmatrix}$$

$$\begin{bmatrix} 0 \\ 1 \\ 0 \end{bmatrix} [X \quad Y\text{-}L \quad Z\text{-}s] = 0 \quad \ldots (6)$$

Where the1 = angle by which thin strip of laser beams U is pivoted on X axis
the2 = angle by which thin strip of laser beams U is yawed on Y axis
the3 = angle by which thin strip of laser beams U is rolled on Z axis
the4 = angular velocity at which thin strip of laser beams U is pivoted on X axis
nop = instant when thin strip of laser beams U traverses a picture element (=(temporal center Npeak of gravity) + (line number))
L = length of base line A0
s = offset between luminescent spot A and front-side principal point 11 as viewed in the direction of Z axis It should be noted that the position of each picture element has to be corrected for distortion. Aberration due to geometric imperfections depends on the field angle. Distortion is substantially symmetrical about a central picture element. Therefore, a distortion factor can be expressed as the function of a distance from a central picture element. In this embodiment, the cubic function of the distance is used as an approximate function. The position of a picture element after the correction is given, in terms of u' and v', by $$u' = u + d1 \times t2^2 \times (u - uO)/t2 + d2 \times t2^3 \times (u \times uO)/t2 \quad (7)$$

$$v' = v + d1 \times t2^2 \times (v - vO)/t2 + d2 \times t2^3 \times (v - vO)/t2 \quad (8)$$

where
d1 = correction factor for the terms of the second degree
d2 = correction factor for the terms of the third degree
$t2 = (t1)^{-2}$ $$t1 = (u - uO)^2 + (v - vO)^2$$

By putting the values of u' and v' into u and v respectively in the equations (4) and (5), the three-dimensional position of the point P disposed on the surface of the object Q can be found in due consideration of distortion. A method of the aforesaid calibration is disclosed, e.g., in "Geometric Correction of Images without Cameras Registration" by Yasuhiro ONODERA and Kenichi KANATANI, Doc. No. PRU91-113 (The electronic communication Society of Japan) or in "An accurate Calibration Method for a Range Finder Based on a 3D Model of the Optical System" by Toshio UESHIBA, Takashi YOSHIMI and Masaki OSHIMA, thesis D-II vol. J74-D-II No.9 pp.1227–1235, '91/9 (The electronic communication Society of Japan).

A modified form of the three-dimensional camera is illustrated in FIGS. 17 to 24, in which like characters designate corresponding parts of the three-dimensional camera 2 shown in FIGS. 3 and 11.

Figure 17:
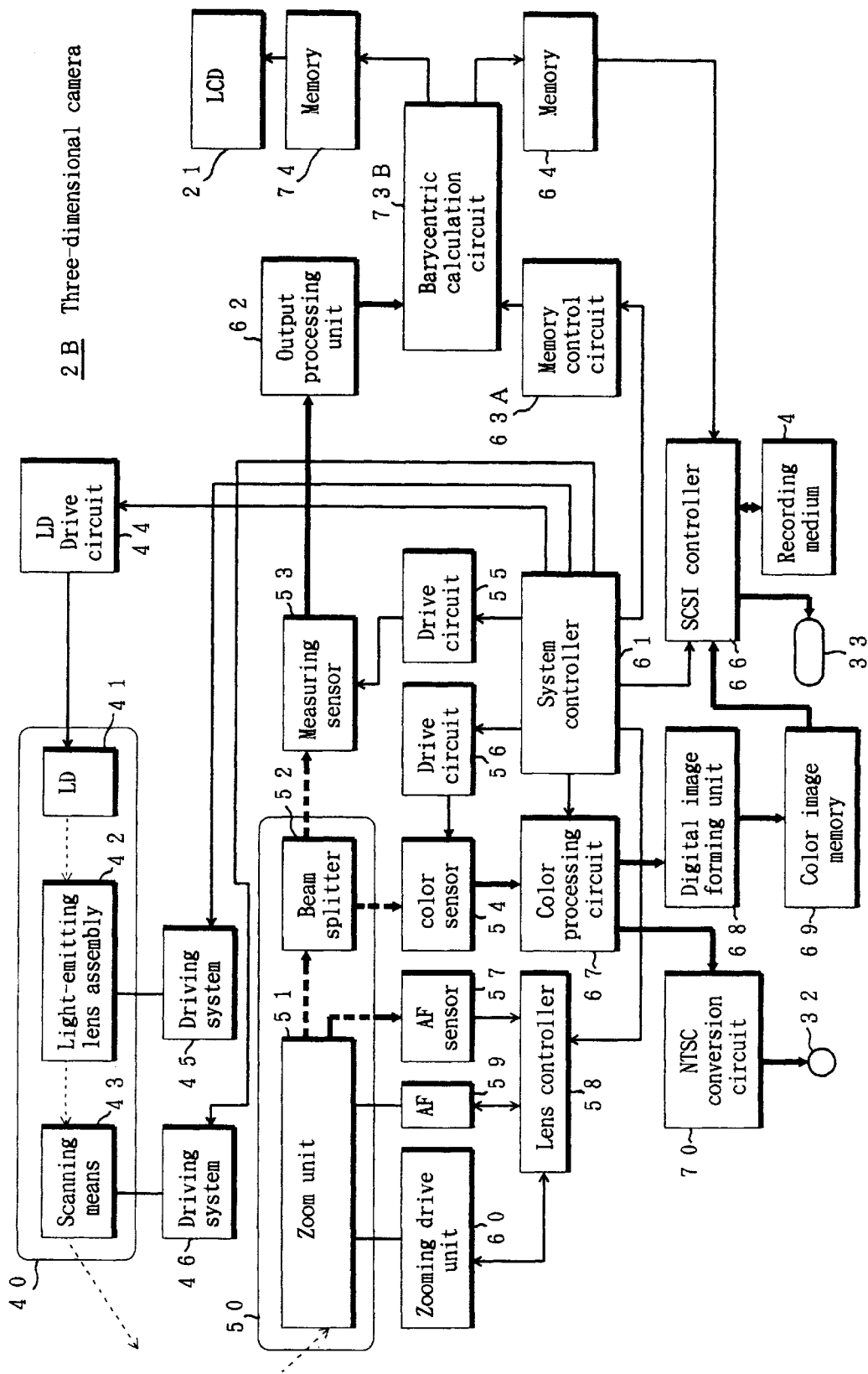
FIG. 17 is a block diagrammatic representation of a modified form of three-dimensional camera.

A three-dimensional camera 2B shown in FIG. 17 differs from the three-dimensional camera 2 shown in FIG. 3 by the fact that the former has a barycentric calculation circuit 73B constructed so as to work differently from the barycentric calculation circuit 73. With this exception, the camera 2B is similar in all respects to the camera 2. Therefore, working parts of the camera 2B other than the barycentric calculation circuit 73B will need no further description.

In the barycentric calculation circuit 73 shown in FIG. 3, software is used for calculating a center of gravity from the light-receiving data read out of the memory 63. By contrast, in the barycentric calculation circuit 73B shown in FIG. 17, a center of gravity is calculated by means of hardware so as to allow data to be processed at high speed.

Although various types of circuits may be used as the barycentric calculation circuit 73B, methods of calculating a center of gravity are divided broadly into two categories. One of them resides in calculating a center of gravity on the basis of a data row obtained from one picture element after another, each picture element being subjected to sampling procedures at a plurality of sampling times. The other of them resides in calculating a center of gravity on the basis of a spatial array of data obtained at a single sampling time. Centers of gravity calculated by these two methods correspond to the aforesaid temporal and spatial centers $N_{peak}$ and $M_{peak}$ of gravity respectively.

Figure 18:
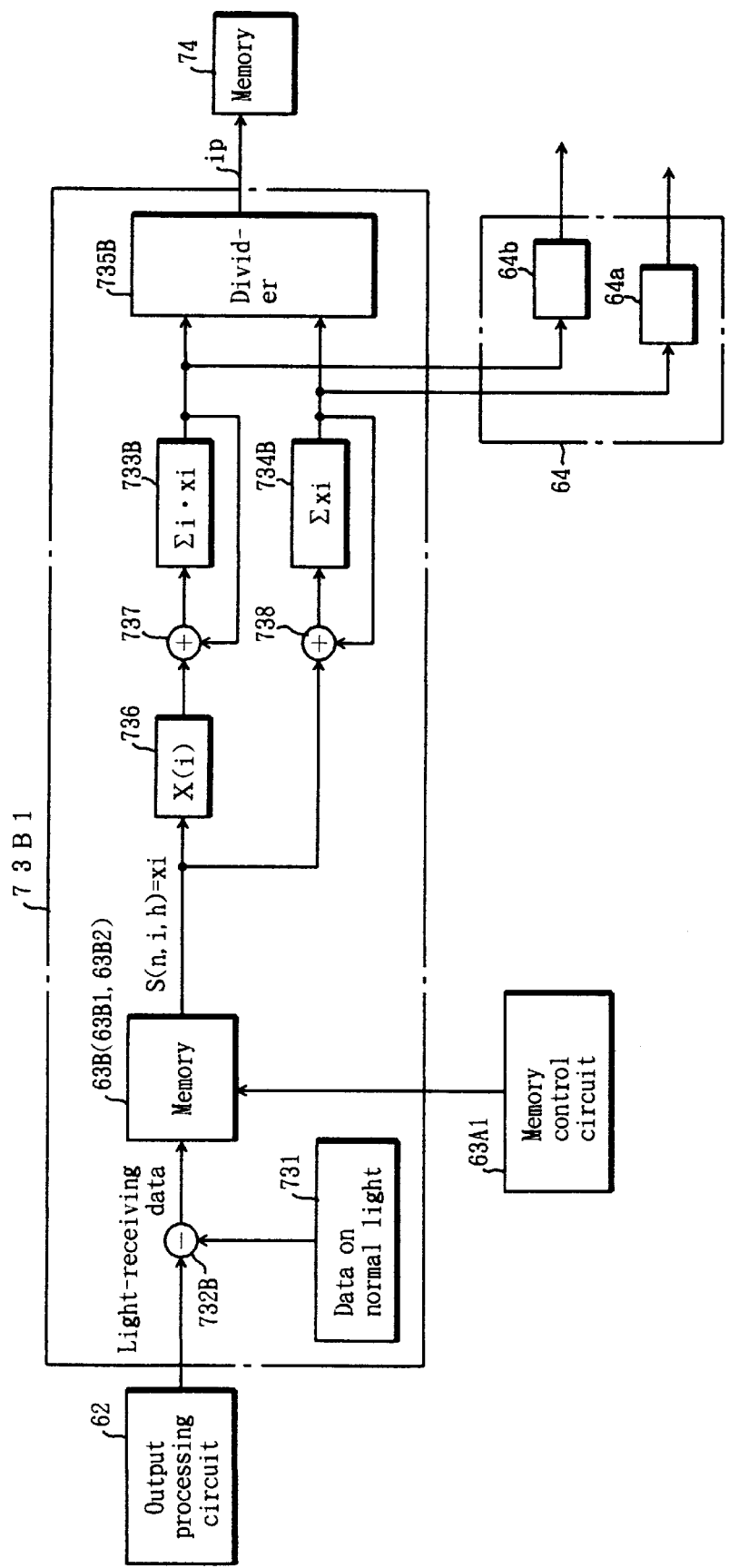
FIG. 18 is a similar view to that shown in FIG. 11 but including a FIFO memory.
Figure 21:
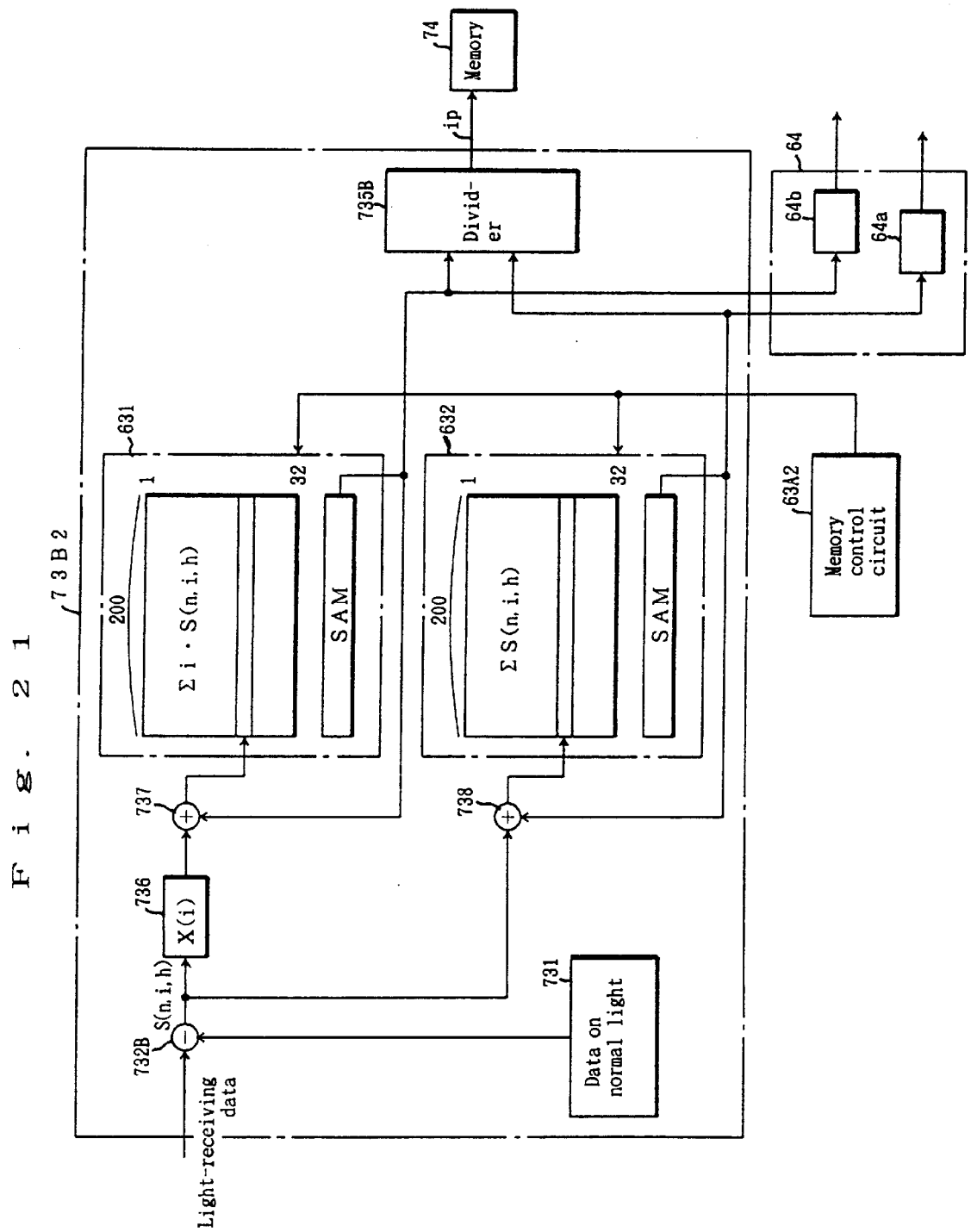
FIG. 21 is a similar view to that shown in FIG. 11 but including a VRAM.

In referring to electrical circuits for materializing the calculation of the temporal center $N_{peak}$ of gravity, it will be noted that two examples of electrical circuits illustrated in FIGS. 18 and 21 are more concrete than the one illustrated in FIG. 11.

Light-receiving data fed in time series to the barycentric calculation circuit 73B1 shown in FIG. 18 are stored in first-in first-out (FIFO) memories. The temporal center $N_{peak}$ of gravity is calculated when a necessary quantity of data have been stored. On the other hand, light-receiving data fed in time series to the barycentric calculation circuit 73B2 shown in FIG. 21 are serially subjected to calculation. Data on numerators and data on denominators are cumulatively added and stored in two independent dual port memories (i.e. VRAM's) respectively. The output of the divider 735B is the temporal center $N_{peak}$ of gravity.

Figure 19:
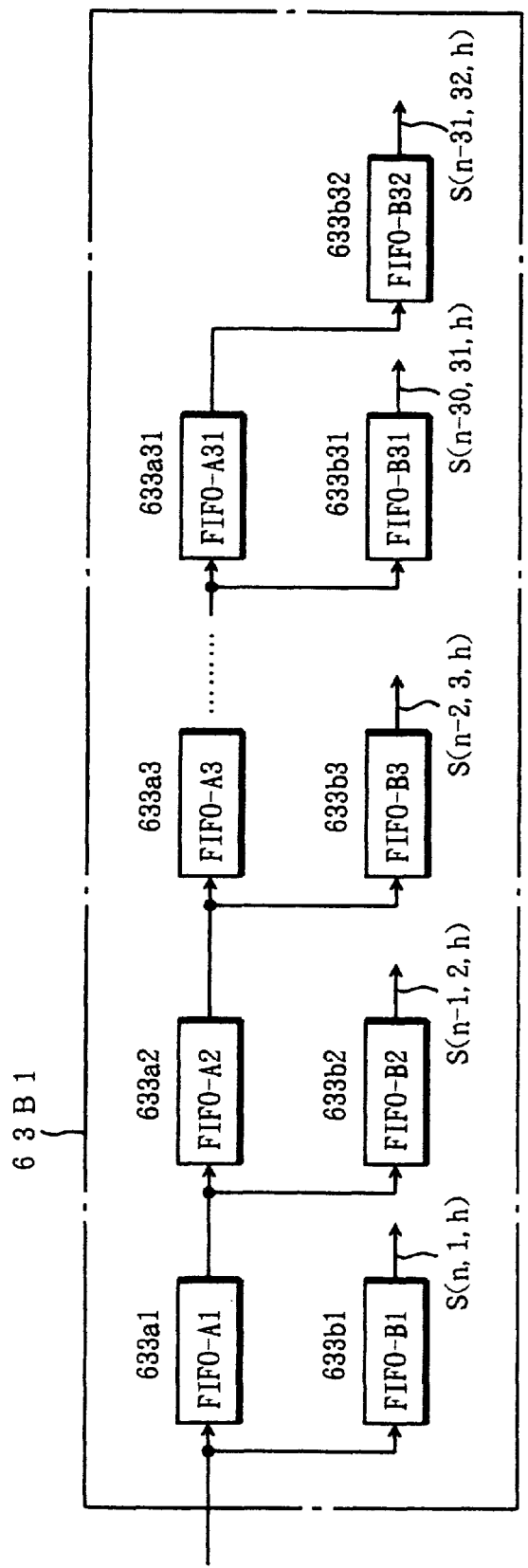
FIG. 19 provides an illustration of an example of the FIFO memory.
Figure 20:
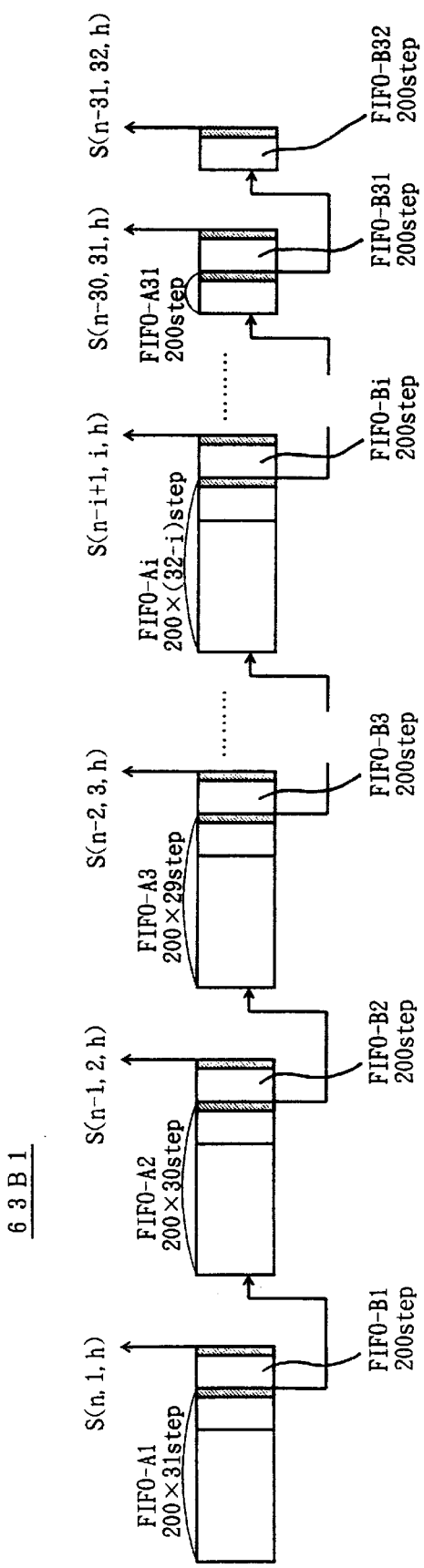
FIG. 20 is a schematic illustration to help explain how the FIFO memory works.

Specific reference is now made to the barycentric calculation circuit 73B1 shown in FIGS. 18 to 20, in which FIFO memories are used.

Light-receiving data transmiitted in time series from the output processing circuit 62 are fed to the subtracter 732B, in which the data ks on normal light are subtracted. Then the light-receiving data are retained in the FIFO memories 63B1 one after another. The memory control circuit 63A1 carries out address assignment for the light-receiving data to be written into and read out of the memories 63B1.

Referring now to FIG. 19, the FIFO memories 633$a$1 to 633$a$31 shown in the upper row are such that the number of memory locations provided in a FIFO memory 633$ai$ is 200×(32−i). Thus the FIFO memories 633$a$1, 633$a$2, 633$a$3, 633$a$31 have 200×31, 200×30, 200×29, . . . , 200×1 memory locations respectively. On the other hand, the number of memory locations provided in each of the FIFO memories 633$b$1 to 633$b$32 shown in the lower row is 200×1.

The first 200 of the data outputted from the FIFO memory 633$a$(i−1) are fed to the FIFO memory 633$bi$, and the remainder of the data is fed to the FIFO memory 633$ai$.

When all the FIFO memories 633$bi$ have been fed with 200 data, the first data (n−i+1, i, 1) is read out of each FIFO memory 633$bi$ (where i=1 to 32). Thus the first data (n, 1, 1), (n−1, 2, 1), (n−2, 3, 1), . . . , (n−31, 32, 1) are read out of the FIFO memories 633$b$1, 633$b$2, 633$b$3, . . . , 633$b$32. Then the second data (n−i+1, i, 2), the third data (n−i+1, i, 3) and so forth are read out of each FIFO memory 633$bi$ (where i=1 to 32). Thus, data can be fetched in time series from a single specific picture element provided on the measuring sensor 53.

A light-receiving data having a horizontal coordinate h and read out of the ith line contained in the nth frame is designated as S(n, i, h).

A temporal center $N_{peak}$ of gravity is found from 32 data S(n, 1, h), S(n−1, 2, h), . . . , S(n−i+1, i, h) , . . . , S(n−31, 32, h) fetched in time series and subjected to arithmetic operations one after another.

The aforesaid 32 data S(n, i, h) are obtained from an identical picture element at different sampling times. Sample numbers 1 to 32 are given respectively to these 32 data, of which the i th data is designated as xi. Then, as shown in FIG. 13, the temporal center $N_{peak}$ of gravity agrees with the center ip of gravity, the latter being obtained from 32 light-receiving data x1 to x32 which in turn are obtained from sampling procedures carried out 32 times.

Referring again to FIG. 18, light-receiving data S(n, i, h), i.e. data xi, are transmitted from the memory 63B1 to the divider 735B either through a multiplier 736, adder 737 and register 733B or through an adder 738 and a register 734B. In the divider 735B, data on numerators transmitted from the register 733B are divided by data on denominators transmitted from the register 734B. The output of the divider 735B is the center ip of gravity (i.e. the temporal center $N_{peak}$ of gravity). Although this circuit is constructed by hardware, it is also possible to materialize the calculation in whole or in part by software.

Data on numerators transmitted from the register 733B and data on denominators transmitted from the register 734B are also fed to the memories 64b and 64a respectively and stored therein, in addition to being fed to the divider 735B for the calculation of centers of gravity.

Specific reference is now made to the barycentric calculation circuit 73B2 shown in FIGS. 21 and 22, in which dual port memories (i.e. VRAM'S) are used.

Light-receiving data transmitted in time series from the output processing circuit 62 are fed to the subtracter 732B, in which the data ks on normal light are subtracted. Then a light-receiving data having a horizontal coordinate h and read out of the i th line contained in the nth frame is designated as S(n, i, h).

The VRAM's 631 and 632 are dual port read/write memories, each of which has a storage capacity of 200×32 bytes and consists of a random access port in which the individual addresses may be accessed in any order and a serial access port which permits data from an addressed line (FIG. 8) to be read out in consecutive or serial form. Each of two registers SAM's shown in FIG. 21 functions as the serial access port. Data from a line specified by address assignment in the VRAM 631 or 632 are transmitted to and read out of the register SAM.

When a light-receiving data S(n, i, h) is to be written into or read out of the VRAM 631 or 632, an address (px, py) to be accessed is given by $$px=h$$
$$py=(n+i-1)-32\times INT((n+i-1)/32)$$

The address (px, py) is assigned in case of writing, while the address (py) is assigned in case of readout. The address (py) assumes a value selected from the group of integers 0 to 31, which correspond to the line numbers 1 to 32 (FIGS. 7(a–b)) respectively.

Data on numerators and data on denominators are stored in the VRAM's 631 and 632 respectively such that, e.g., a line in the VRAM 631 in which the data on numerators to be taken from the (n+i−1)th line on the surface of the measuring sensor 53 are to be stored is specified by an address (py) as defined by the above formula.

Data already stored in a line to which an address (py) is assigned in each of the VRAM's 631 and 632 are set in the serial access ports prior to the writing of new data into the VRAM's 631 and 632, i.e., prior to the readout from the lines on the surface of the measuring sensor 53. Old data are read out of the serial access ports, fed to the adders 737 and 738, and added therein to the new data transmitted from the corresponding picture elements of the measuring sensor 53. The outputs taken from the adders 737 and 738 are written into the addresses (px, py) in the VRAM's 631 and 632 respectively through the random access ports. Data transmitted from 200 picture elements in a line are processed in this manner so that the contents of a line in the VRAM 631 and a line in the VRAM 632 may be updated. Data on 32 frames are accumulated in this manner.

Before data on the next frame, i.e. on the next line, are written, accumulated data on 32 frames are transmitted from the serial access ports to the divider 735B when the data on 32 frames on the surface of the measuring sensor 53 have been accumulated in the corresponding lines in the VRAM's 631 and 632.

In the divider 735B, data on numerators forming one part of the aforesaid accumulated data are divided by data on denominators forming the other part thereof. The output of the divider 735B is the center ip of gravity (i.e. the temporal center $N_{peak}$ of gravity), which is fed to the memory 74 provided just short of the LCD 21. Data on numerators transmitted from the VRAM 631 and data on denominators transmitted from the VRAM 632 are also fed to the memories 64b and 64a respectively and stored therein.

The memory control circuit 63A2 controls the aforesaid manner in which the VRAM's 631 and 632 work. In the multiplier 736, each of the data on numerators is multiplied by a weight factor i.

In referring to electrical circuits for materializing the calculation of the spatial center $M_{peak}$ of gravity, it will be noted that two examples of electrical circuits are illustrated in FIGS. 18 and 24. Light-receiving data fed in time series to the barycentric calculation circuit 73B1 shown in FIG. 18 are stored in different FIFO memories from those used for the calculation of the temporal center $N_{peak}$ of gravity. On the other hand, the barycentric calculation circuit 73B3 shown in FIG. 24 differs from the barycentric calculation circuit 73B2 shown in FIG. 21 by the fact that data on numerators and data on denominators are stored in two independent register assemblies instead of being stored in two independent VRAM's.

Specific reference is now made to the barycentric calculation circuit 73B1 shown in FIG. 18, in which FIFO memories are used.

Light-receiving data transmiitted in time series from the output processing circuit 62 are fed to the subtracter 732B, in which the data ks on normal light are subtracted. Then the light-receiving data are retained in the FIFO memories 63B2 one after another.

Figure 23:
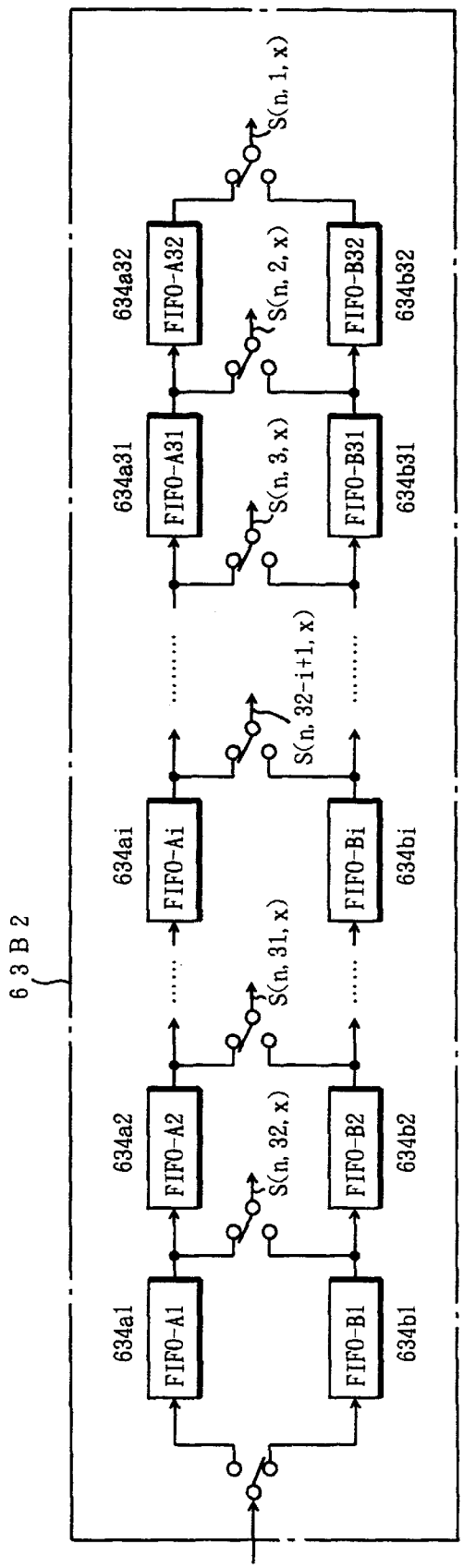
FIG. 23 provides.an illustration of another example of the FIFO memory.
Figure 25A:
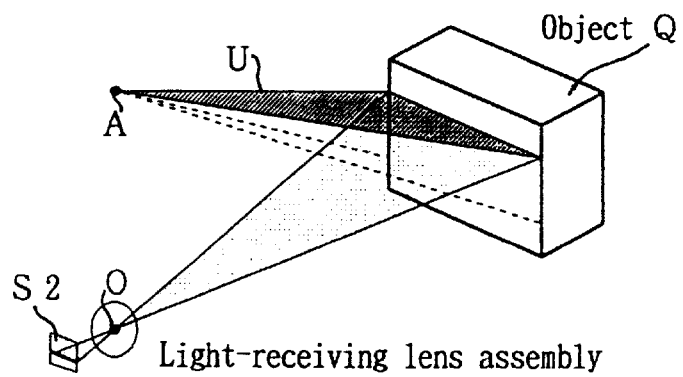
FIGS. 25(*a–d*) provides diagrammatic illustrations of the light section method.
Figure 25B:
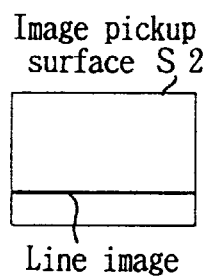
Figure 25C:
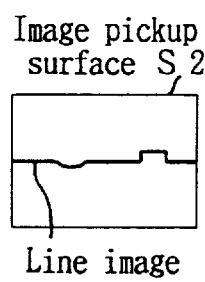
Figure 25D:
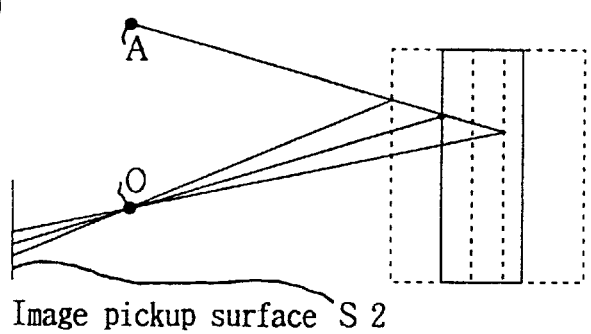

Referring now to FIG. 23, the number of memory locations provided in each of the FIFO memories 634a1 to 634a32 and 634b1 to 634b32 is 200×1.

At the moment when a data outputted from the n th frame is written into the FIFO memory 634ai, a data outputted from the (n−1)th frame and retained in the FIFO memory 634bi is read out of the same. Likewise, at the moment when a data outputted from the (n+1)th frame is written into the FIFO memory 634bi, a data outputted from the n th frame and retained in the FIFO memory 634ai is read out of the same. The memory control circuit 63A1 controls the manner in which the contents of the FIFO memories are read or written.

The first data is read out of each FIFO memory 634ai in order of the FIFO memories 634a32, 634a31, 634a30, . . .

, 634a2 and 634a1. Until the 200th data is read out of each FIFO memory 634ai, the similar procedure is repeated for the second data, third data and so forth.

A data row obtained from such readout is as follows: S(n, 1, 1), S(n, 2, 1), S(n, 3, 1), . . . , S(n, 32, 1) S(n, 1, 2), S(n, 2, 2), S(n, 3, 2), . . . , S(n, 32, 2) S(n, 1, 200), S(n, 2, 200), S(n, 3, 200), . . . , S(n, 32, 200)

These data are fed to a back-end arithmetic circuit (not shown).

A "light-receiving data S(n, i, h)" is defined differently from that which is used for the calculation of the temporal center $N_{peak}$ of gravity. This expression as used for the calculation of the spatial center $M_{peak}$ of gravity is representative of 32 data having an identical horizontal coordinate h, i.e. obtained at a time from 32 picture elements vertically aligned with each other. Sample numbers 1 to 32 are given respectively to these 32 data, of which the i th data is designated as xi. Then, the spatial center $M_{peak}$ of gravity agrees with the center ip of gravity, the latter being obtained from 32 light-receiving data x1 to x32 which in turn are obtained from sampling procedures carried out 32 times.

Referring again to FIG. 18, light-receiving data S(n, i, h), i.e. data xi, are transmitted from the memory 63B2 to the divider 735B either through a multiplier 736, adder 737 and register 733B or through an adder 738 and a register 734B. In the divider 735B, data on numerators transmitted from the register 733B are divided by data on denominators transmitted from the register 734B. The output of the divider 735B is the center ip of gravity (i.e. the spatial center $M_{peak}$ of gravity).

Data on numerators transmitted from the register 733B and data on denominators transmitted from the register 734B are also fed to the memories 64b and 64a respectively and stored therein, in addition to being fed to the divider 735B for the calculation of centers of gravity.

Specific reference is now made to the barycentric calculation circuit 73B3 shown in FIG. 24, in which register assemblies are used.

Light-receiving data transmitted in time series from the output processing circuit 62 are fed to the subtracter 732B, in which the data ks on normal light are subtracted. The outputs taken from the subtracter 732B are the light-receiving data S(n, i, h). In the multiplier 736, each of the data on numerators is multiplied by a weight factor i Registers 635 to 638 are read/write memories, each of which has a storage capacity of 200 bytes. Data on numerators are stored in the registers 635 and 636, while data on denominators are stored in the registers 637 and 638.

Prior to the readout from the lines on the surface of the measuring sensor 53, data having a horizontal coordinate h and accumulated in the registers 635 and 637 are transmitted to the registers 636 and 638 respectively and stored therein. These data are added to the new data and written into the registers 635 and 637 respectively. The memory control circuit 63A3 controls the manner in which the contents of the registers 635 to 638 are read or written in synchronism with the readout from the lines on the surface of the measuring sensor 53.

Data on numerators and data on denominators are cumulatively added respectively 32 times in this manner and transmitted from the registers 635 and 637 to the divider 735B, in which a center ip of gravity (i.e. a spatial center $M_{peak}$ of gravity) is found.

It is apparent from the above that the method of calculating a temporal center of gravity in this invention is characterized in that the instant "nop", which is included in the equation (6), is not determined by detecting an instant when the largest quantity of light is incident on a picture element but determined by detecting a center ip of gravity (i.e. a temporal center $N_{peak}$ of gravity) calculated by arithmetic operations performed during the time when a picture element falls within the effective light-receiving region Ae. Consequently, the three-dimensional measuring system embodying this invention is hardly affected by noise interference. Furthermore, a peak detector can be dispensed with, because samples of the outputs (x) of each picture element are taken periodically for a prescribed length of time.

Instead of 32 lines used as a vertical coverage of the effective light-receiving region Ae in the embodiment described, it is also possible to use 15 lines, 10 lines, 5 lines, etc. disposed right over and right beneath the peak position respectively. The vertical coverage of the effective light-receiving region Ae correlated with the peak position in this manner serves to minimize adverse influence exerted by undesired light beams reflected on the surface of the object Q.

The method of calculating a spatial center of gravity in this invention is characterized in that the peak position at a specific instant is determined by detecting a center ip of gravity (i.e. a spatial center $M_{peak}$ of gravity) calculated by arithmetic operations performed with respect to 32 picture elements vertically aligned with each other in the effective light-receiving region Ae. Consequently, the three-dimensional measuring system embodying this invention is hardly affected by noise interference. Furthermore, a peak detector can be dispensed with, because samples of the outputs (x) are taken from the picture elements falling within the thickness w (FIG. 2(a)) of the thin strip of laser beams U incident on the measuring sensor 53.

In place of data D62 (FIG. 14) used for calculating the three-dimensional position of the point P (FIGS. 26(a–c)) in the embodiment described, it is also possible to use, for the same purpose, data on the center ip of gravity found in the barycentric calculation circuit 73 or 73B. Instead of allowing the host computer 3 to calculate the three-dimensional position of the point P, it is also possible to incorporate means for implementing such calculation in the three-dimensional camera 2. It is further possible to allow such calculation to be implemented with a look-up table. In place of the zoom unit 51 used for changing the magnification in the embodiment described, it is also possible to use an interchangeable lens.

The centers of gravity and the three-dimensional position of the point P need not necessarily be calculated in terms of physical quantities. Furthermore, several algorithms or methods of calculation may be appropriate to choose from.

The aforesaid calculation may be carried out by means of software, i.e., by means of a program executed by a microprocessor or the like. Alternatively, the aforesaid calculation may be carried out in whole or in part by means of hardware, i.e., by means of a logic circuit. Alternatively, software and hardware may be put together in a single electrical circuit.

The three-dimensional measuring system embodying this invention may further comprise an optical instrument for carrying out optical measurement and a computer for performing arithmetic operations. The optical instrument and the computer may be two independent components disposed outwardly of the three-dimensional measuring system. In this case, a portion of the arithmetic circuit may be incorporated in the optical instrument. Alternatively, the three-dimensional measuring system per se may be formed to include both the optical instrument and the computer. Changes in the construction of the three-dimensional measuring system 1, three-dimensional camera 2, 2B and host computer 3, as well as the data processing system design may be made without departing from the nature and principle of the invention.

What is claimed is:

1. A three-dimensional measuring system for measuring a shape of an object, said three dimensional measuring system comprising:

an optical mechanism for emitting a light that illuminates the object, and optically scanning the object;

an image pickup sensor for receiving light reflected from the object, said image pickup sensor having a plurality of light-receiving regions across which the reflected light traverses;

a scanning device for changing a direction in which said light illuminates said object;

an image pickup control device for driving said image pickup sensor to output information indicating an amount of the reflected light incident on each of said light-receiving regions over time;

a first arithmetic unit for determining a time when said reflected light traverses each of said light-receiving regions, each time being determined by implementing a barycentric calculation based on samples (x) of the information output by said image pickup sensor taken periodically over a prescribed period of time and an instant (i) at which each of said samples (x) is taken; and a second arithmetic unit for determining a position on a surface of said object that corresponds to each of said light-receiving regions, each position being determined based on a relationship between the direction in which said light illuminates said object at the time when said reflected light traverses the light-receiving region and a direction in which said reflected light is incident on the light-receiving region.

2. A three-dimensional measuring system as defined in claim 1, wherein said first arithmetic unit comprises:

a first adder for calculating a first sum $\Sigma(x \cdot i)$, said first sum being a summation of products for all samples (x), with each product being of a sample (x) and a corresponding instant (i) at which the sample (x) was taken;

a second adder for calculating a second sum $\Sigma(x)$ for all of said samples (x); and a divider for calculating a quotient $\Sigma(x \cdot i)/\Sigma(x)$ of the first sum divided by the second sum, said quotient being a temporal center $N_{peak}$ of gravity.

3. A three-dimensional measuring system as defined in claim 1 or 2, wherein each said prescribed period of time is a period of time for allowing said reflected light to traverse an effective domain of a corresponding light-receiving region, said effective domain corresponding to a measurable range within which said object falls.

4. A three-dimensional measuring system for measuring a shape of an object, said three dimensional measuring system comprising:

an optical mechanism for emitting a light that illuminates the object, and optically scanning the object;

an image pickup sensor for receiving light reflected from the object, said image pickup sensor having an image pickup surface including a plurality of light-receiving regions across which the reflected light traverses;

a scanning device for changing a direction in which said light illuminates said object;

an image pickup control device for driving said image pickup sensor to output information indicating an amount of the reflected light incident on each of said light-receiving regions over time;

a first arithmetic unit for determining a position on said image pickup surface on which a largest amount of reflected light from light illuminating said object in a specific direction is incident, said position being found by implementing a barycentric calculation based on samples (x) of the information output by said image pickup sensor and position coordinates (i) of reflected light incident on said light-receiving regions that falls within a predetermined vertical light-receiving range on the image pickup surface and with which said samples (x) correspond; and a second arithmetic unit for determining a position on a surface of said object that corresponds to each of said light-receiving regions, each position on the surface of said object being determined based on a relationship between said specific direction and a direction in which said reflected light is incident on said position determined by said first arithmetic unit.

5. A three-dimensional measuring system as defined in claim 4, wherein said first arithmetic unit comprises:

a first adder for calculating a first sum $\Sigma(x \cdot i)$, said first sum being a summation of products for all samples (x), with each product being of a sample (x) and the corresponding position coordinate (i);

a second adder for calculating a second sum $\Sigma(x)$ for all of said samples (x); and a divider for calculating a quotient $\Sigma(x \cdot i)/\Sigma(x)$ of the first sum divided by the second sum, said quotient being a spatial center $M_{peak}$ of gravity.

6. A three-dimensional measuring system as defined in claim 4 or 5, wherein said predetermined vertical light-receiving range corresponds with an effective domain of said light-receiving regions that correspond to a measurable range within which said object falls.

7. A method of measuring a shape of an object, said method comprising:

a projecting step of projecting a light onto the object and scanning the object with the light;

a receiving step of receiving light reflected from the object with an image pickup sensor having a plurality of light-receiving regions across which the reflected light traverses according to the scanning of the object;

a sampling step of periodically sampling information indicating an amount of the reflected light incident of on each of said light-receiving regions over time period;

a storing step of storing into a memory the information which is periodically sampled over a predetermined time period for each of said light-receiving regions;

a first determining step of determining a time when said reflected light traverses each of said light-receiving regions, each time being determined by implementing a barycentric calculation based on samples (x) of the information stored in the memory and an instant (i) at which each of said samples (x) is taken; and a second determining step of determining a position on a surface of said object that corresponds to each of said light-receiving regions, each position being determined based on a relationship between a direction in which said light illuminates said object at the time when said reflected light traverses the light-receiving region and a direction in which said reflected light is incident on the light-receiving region.

8. A method according to claim 7, wherein said first determining step comprises:

calculating a first sum $\Sigma(x \cdot i)$, said first sum being a summation of products for all samples (x), with each product being of a sample (x) and a corresponding instant (i) at which the sample (x) was taken;

calculating a second sum $\Sigma(x)$ for all of said samples (x); and calculating a quotient $\Sigma(x \cdot i)/\Sigma(x)$ of the first sum divided by the second sum, said quotient being a temporal center $N_{peak}$ of gravity.

9. A method of measuring a shape of an object, said method comprising:

a projecting step of projecting a light onto the object and scanning the object with the light;

a receiving step of receiving light reflected from the object with an image pickup sensor having an image pickup surface including a plurality of light-receiving regions across which the reflected light traverses according to the scanning of the object;

a sampling step of periodically sampling information indicating an amount of the reflected light incident on each of said light-receiving regions over time period;

a storing step of storing into a memory the information which is periodically sampled for each of said light-receiving regions;

a first determining step of determining a position on said image pickup surface on which a largest amount of reflected light from light illuminating said object in a specific direction is incident, said position being found by implementing a barycentric calculation based on samples (x) of the information stored in the memory and position coordinates (i) of reflected light incident on said light-receiving regions that falls within a pre-determined vertical light-receiving range on the image pickup surface and with which said samples (x) correspond; and a second determining step of determining a position on a surface of said object that corresponds to each of said light-receiving regions, each position on the surface of said object being determined based on a relationship between said specific direction and a direction in which said reflected light is incident on said position determined in said first determining step.

10. A method according to claim 9, wherein said first determining step comprises:

calculating a first sum $\Sigma(x \cdot i)$, said first sum being a summation of products for all samples (x), with each product being of a sample (x) and the corresponding position coordinate (i);

calculating a second sum $\Sigma(x)$ for all of said samples (x); and calculating a quotient $\Sigma(x \cdot i)/\Sigma(x)$ of the first sum divided by the second sum, said quotient being a spatial center $M_{peak}$ of gravity.

11. A three-dimensional measuring apparatus for measuring a shape of an object, said three-dimensional measuring apparatus comprising:

a scanner for emitting a light that illuminates the object, and scanning the object with the light;

an image pickup sensor for receiving light reflected from the object, said image pick sensor having a plurality of light-receiving regions across which the reflected light traverses according to the scanning of the object;

an image pickup controller for driving said image pickup sensor to sample information indicating an amount of the reflected light incident on each of said light-receiving regions at each of sampling instants over a scanning period;

a first arithmetic unit for determining a time when said reflected light traverses each of said light-receiving regions, each time being determined by implementing a barycentric calculation based on samples (x) of the information output by said image pickup sensor taken at each of the sampling instants belonging to a prescribed period of time and an sampling instant (i) at which each of said samples (x) is taken; and an output unit for outputting information relating to said determined time for calculating a position on a surface of said object that corresponds to each light-receiving regions.

12. A three-dimensional measuring apparatus as defined in claim 11, wherein said first arithmetic unit comprises:

a first adder for calculating a first sum $\Sigma (x \cdot 1)$, said first sum being determined a summation of products for all samples (x), with each product being of a sample (x) and a corresponding instant (i) at which the sample (x) was taken;

a second adder for calculating a second sum $\Sigma (x)$ for all of said samples (x); and a divider for calculating a quotient $\Sigma (x \cdot 1)/\Sigma(x)$ of the first sum divided by the second sum, said quotient being a temporal center $N_{peak}$ of gravity.

13. A three-dimensional measuring apparatus as defined in claim 11, wherein said prescribed period of time is a period of time for allowing said reflected light to traverse the light-receiving regions belonging to an effective range, said effective range corresponding to a measurable range within which said object falls.

14. A three-dimensional measuring apparatus as defined in claim 11, further comprising:

a second arithmetic unit for determining based on the information output by said output unit, the position on the surface of said object that corresponding to each of said light-receiving regions.

15. A three-dimensional measuring apparatus for measuring a shape of an object, said three-dimensional measuring apparatus comprising:

a scanner for emitting a light that illuminates the object, and scanning the object with light;

an image pickup sensor for receiving light reflected from the object, said image sensor having an image pickup surface including a plurality of light-receiving regions across which the reflected light traverses according to the scanning of the object;

an image pickup controller for driving said image pickup sensor to sample information indicating an amount of the reflected light incident on each of said light-receiving regions at each of sampling instants over a scanning period;

a first arithmetic unit for determining a position on said image pickup surface on which a largest amount of reflected light from light illuminating said object is incident for each of the sampling instants, each position being found by implementing a barycentric calculation based on samples (x) of the information output by said light-receiving regions belonging to said predetermined light-receiving range and position coordinates (i) of said light-receiving regions which takes said samples (x);

and an output unit for outputting information relating to said determined position for calculating a position on the object surface.

* * * * *